US012603736B2

(12) United States Patent (10) Patent No.: US 12,603,736 B2
Minotani et al. (45) Date of Patent: Apr. 14, 2026

(54) COMMUNICATION DEVICE AND COMMUNICATION METHOD

(71) Applicant: Panasonic Intellectual Property Corporation of America, Torrance, CA (US)

(72) Inventors: Jun Minotani, Ishikawa (JP); Yoshio Urabe, Nara (JP); Takashi Iwai, Ishikawa (JP); Tomofumi Takata, Ishikawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 320 days.

(21) Appl. No.: 18/260,581

(22) PCT Filed: Jul. 9, 2021

(86) PCT No.: PCT/JP2021/026004
§ 371 (c)(1),
(2) Date: Jul. 6, 2023

(87) PCT Pub. No.: WO2022/153579
PCT Pub. Date: Jul. 21, 2022

(65) Prior Publication Data
US 2024/0080150 A1 Mar. 7, 2024

(30) Foreign Application Priority Data
Jan. 15, 2021 (JP) ................................. 2021-005046

(51) Int. Cl.
*H04L 5/00* (2006.01)
*H04W 72/20* (2023.01)

(52) U.S. Cl.
CPC ........... *H04L 5/0048* (2013.01); *H04W 72/20* (2023.01)

(58) Field of Classification Search
None
See application file for complete search history.

(56) References Cited

U.S. PATENT DOCUMENTS

2010/0232384 A1* 9/2010 Farajidana .......... H04L 25/0204
370/329
2017/0295504 A1* 10/2017 Yoo ......................... H04L 5/005
2022/0030572 A1* 1/2022 Shellhammer ........ H04L 5/0096

FOREIGN PATENT DOCUMENTS

WO WO 2010105229 A1 9/2010

OTHER PUBLICATIONS

Agrawal et al., "Decoupling Channel Training form NSTS," IEEE 802.11-20/0486r0, Mar. 16, 2020. (13 pages).
(Continued)

*Primary Examiner* — Clemence S Han
(74) *Attorney, Agent, or Firm* — Seed Intellectual Property Law Group LLP

(57) ABSTRACT

The present invention improves channel estimation accuracy in wireless communication. This communication device comprises: a control circuit that sets, to a control signal, information relating to an additional reference signal for each destination device; and a transmission circuit that transmits the control signal.

9 Claims, 29 Drawing Sheets

(56)     References Cited

OTHER PUBLICATIONS

Cao et al., "EHT NLTF Design," IEEE 802.11-20/1375r2, Aug. 27, 2020. (17 pages).

International Search Report, mailed Sep. 14, 2021, for International Patent Application No. PCT/JP2021/026004. (3 pages) (with English Translation).

Extended European Search Report, dated Jun. 12, 2024, for European Patent Application No. 21919471.9-1206. (9 pages).

* cited by examiner

| Legacy | RL-SIG | U-SIG | EHT-SIG | EHT-STF | EHT-LTF | ... | EHT-LTF | Data |

FIG. 1

| $N_{sts,total}$ | $N_{VHT-LTF}$ |
|---|---|
| 1 | 1 |
| 2 | 2 |
| 3 | 3 |
| 4 | 4 |
| 5 | 6 |
| 6 | 6 |
| 7 | 8 |
| 8 | 8 |

FIG. 4

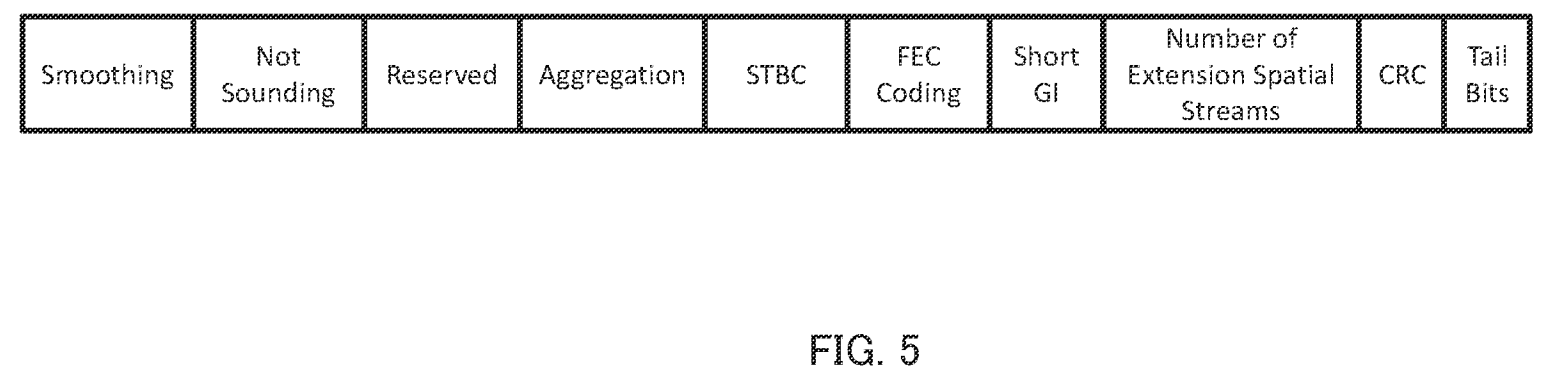

| Smoothing | Not Sounding | Reserved | Aggregation | STBC | FEC Coding | Short GI | Number of Extension Spatial Streams | CRC | Tail Bits |
|-----------|-------------|----------|-------------|------|------------|----------|------------------------------------|-----|-----------|

FIG. 5

| $N_{STS}$ | $N_{HT-DLTF}$ |
|:---:|:---:|
| 1 | 1 |
| 2 | 2 |
| 3 | 4 |
| 4 | 4 |

FIG. 6

| $N_{ESS}$ | $N_{HT-ELTF}$ |
|:---:|:---:|
| 0 | 0 |
| 1 | 1 |
| 2 | 2 |
| 3 | 4 |

| EHT-MCS index | Modulation (Method 1) | Modulation (Method 2) |
|---|---|---|
| ... | ... | ... |
| 15 | BPSK+Extra-LTF (original LTF +2LTF) | BPSK+Extra-LTF (original LTF x2) |
| 16 | BPSK+Extra-LTF (original LTF +4LTF) | BPSK+Extra-LTF (original LTF x4) |

FIG. 22

| EHT-MCS index | Modulation (Method 1) | Modulation (Method 2) |
|---|---|---|
| ... | ... | ... |
| 15 | 4096QAM+Extra-LTF (original LTF +2LTF) | 4096QAM+Extra-LTF (original LTF x2) |
| 16 | 4096QAM+Extra-LTF (original LTF +4LTF) | 4096QAM+Extra-LTF (original LTF x4) |

FIG. 23

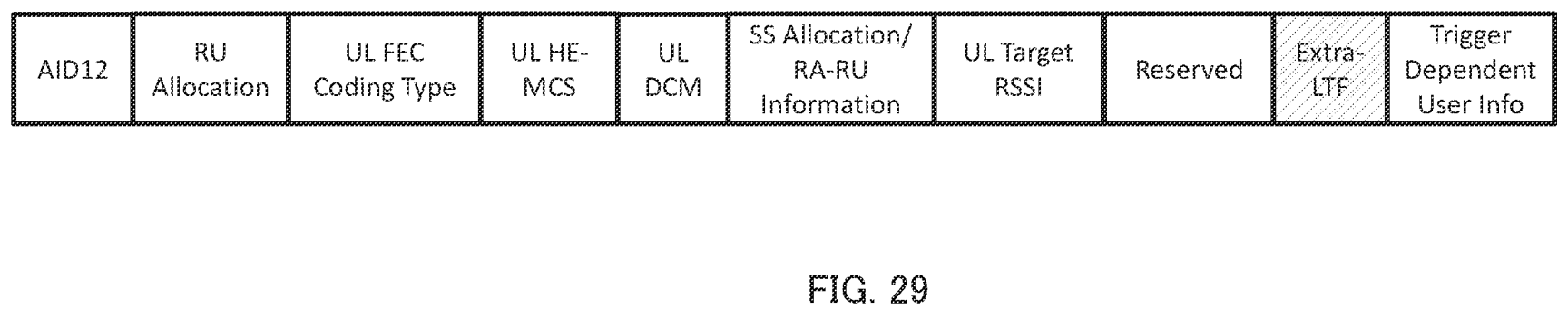

| AID12 | RU Allocation | UL FEC Coding Type | UL HE-MCS | UL DCM | SS Allocation/ RA-RU Information | UL Target RSSI | Reserved | Extra-LTF | Trigger Dependent User Info |
|---|---|---|---|---|---|---|---|---|---|

FIG. 29

| Trigger Type Subfield value | Trigger frame variant |
|---|---|
| ... | ... |
| 8 | Extra-LTF |

FIG. 30

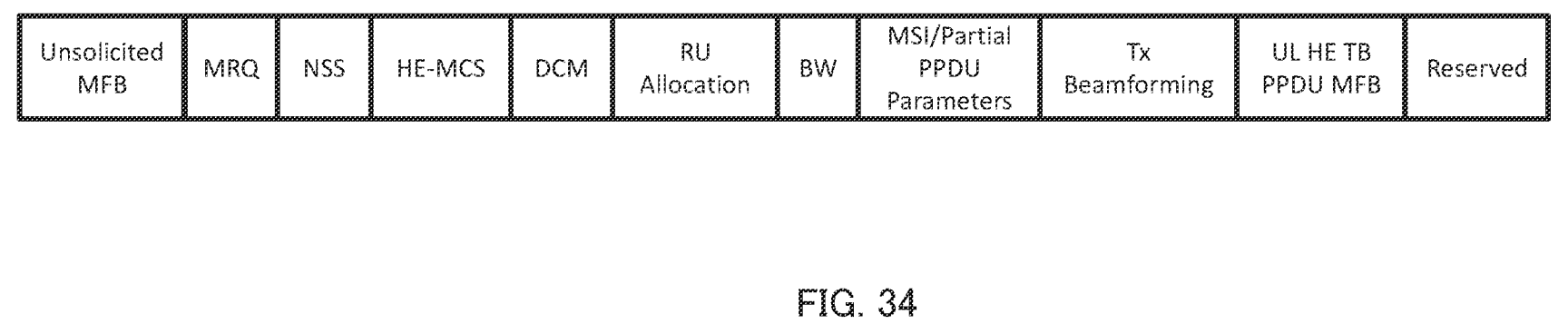

| Unsolicited MFB | MRQ | NSS | HE-MCS | DCM | RU Allocation | BW | MSI/Partial PPDU Parameters | Tx Beamforming | UL HE TB PPDU MFB | Reserved |
|---|---|---|---|---|---|---|---|---|---|---|

FIG. 34

COMMUNICATION DEVICE AND COMMUNICATION METHOD

TECHNICAL FIELD

The present disclosure relates to a communication apparatus and a communication method.

BACKGROUND ART

Task Group (TG) has been developing the technical specification of the Institute of Electrical and Electronics Engineers (IEEE) 802.11be (hereinafter, referred to as "11be") as the successor standard of IEEE 802.11.ax (hereinafter, referred to as "11ax"), which is a standard of IEEE 802.11.

CITATION LIST

Non Patent Literature

NPL 1
IEEE 802.11-20/486r0, "Decoupling Channel Training from NSTS," March, 2020
NPL 2
IEEE 802.11-20/1375r2, "EHT LTF Design," October, 2020

SUMMARY OF INVENTION

There is scope for further study, however, on a method of improving channel estimation accuracy in radio communication.

One non-limiting and exemplary embodiment of the present disclosure facilitates providing a communication apparatus and a communication method each capable of improving channel estimation accuracy in radio communication.

A communication apparatus according to an embodiment of the present disclosure includes: control circuitry, which, in operation, sets, to a control signal, information on an extra reference signal for each destination apparatus; and transmission circuitry, which, in operation, transmits the control signal.

It should be noted that general or specific embodiments may be implemented as a system, an apparatus, a method, an integrated circuit, a computer program, a storage medium, or any selective combination thereof.

According to an exemplary embodiment of the present disclosure, it is possible to improve channel estimation accuracy in radio communication.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 1 illustrates an exemplary extremely high throughput physical layer convergence procedure protocol data unit (EHT PPDU) format;

FIG. 4 illustrates examples of the number of very high throughput-long training fields (VHT-LTFs) for each number of spatial streams;

FIG. 5 illustrates an exemplary HT-SIG2 format of IEEE 802.11n;

FIG. 6 illustrates an exemplary relation between the number of spatial streams of a data portion and the number of LTFs;

FIG. 7 illustrates an exemplary relation between the number of extension spatial streams and the number of HT-extended LTFs (HT-ELTFs);

FIG. 22 illustrates an exemplary table of MCS to which a combination of higher-order modulation and an extra-LTF is added in a case of multiple users (MU);

FIG. 23 illustrates an exemplary trigger frame user info format for indicating the extra-LTF information in the user information;

FIG. 29 illustrates an exemplary trigger frame user info format for indicating the extra-LTF information in each user information;

FIG. 30 illustrates an exemplary trigger frame type for indicating the extra-LTF;

FIG. 34 illustrates an exemplary link adaptation control information format.

DESCRIPTION OF EMBODIMENTS

Hereinafter, embodiments of the present disclosure will be described in detail with reference to the accompanying drawings.

In 11be, studies have been carried out on a method of transmitting more extreme high throughput-LTFs (EHT-LTFs) than high efficient non-legacy long training fields (hereinafter, referred to as HE-LTFs) of 11ax determined from the number of spatial streams (SSs) for improving channel estimation accuracy, which is one of the objectives (e.g., NPLs 1 and 2).

Figure 1:
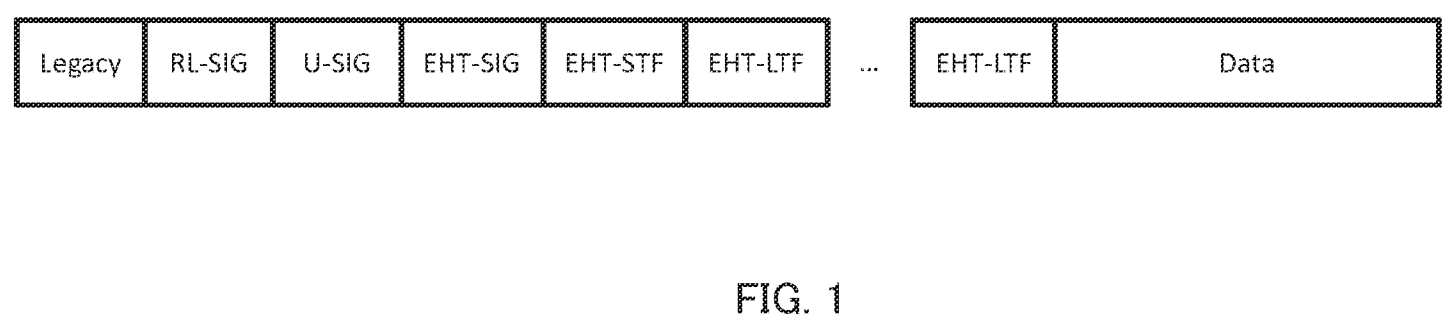

FIG. 1 illustrates an exemplary EHT physical layer convergence procedure protocol data unit (EHT PPDU) format for indicating EHT-LTFs. In FIG. 1, the signal (SIG) field including the U-SIG field and EHT-SIG field is a non-limiting example of a control signal. As illustrated in FIG. 1, the EHT PPDU is possibly configured with one or more EHT-LTFS. The EHT-LTF is a non-limiting example of an extra reference signal.

Figures 2, 3:
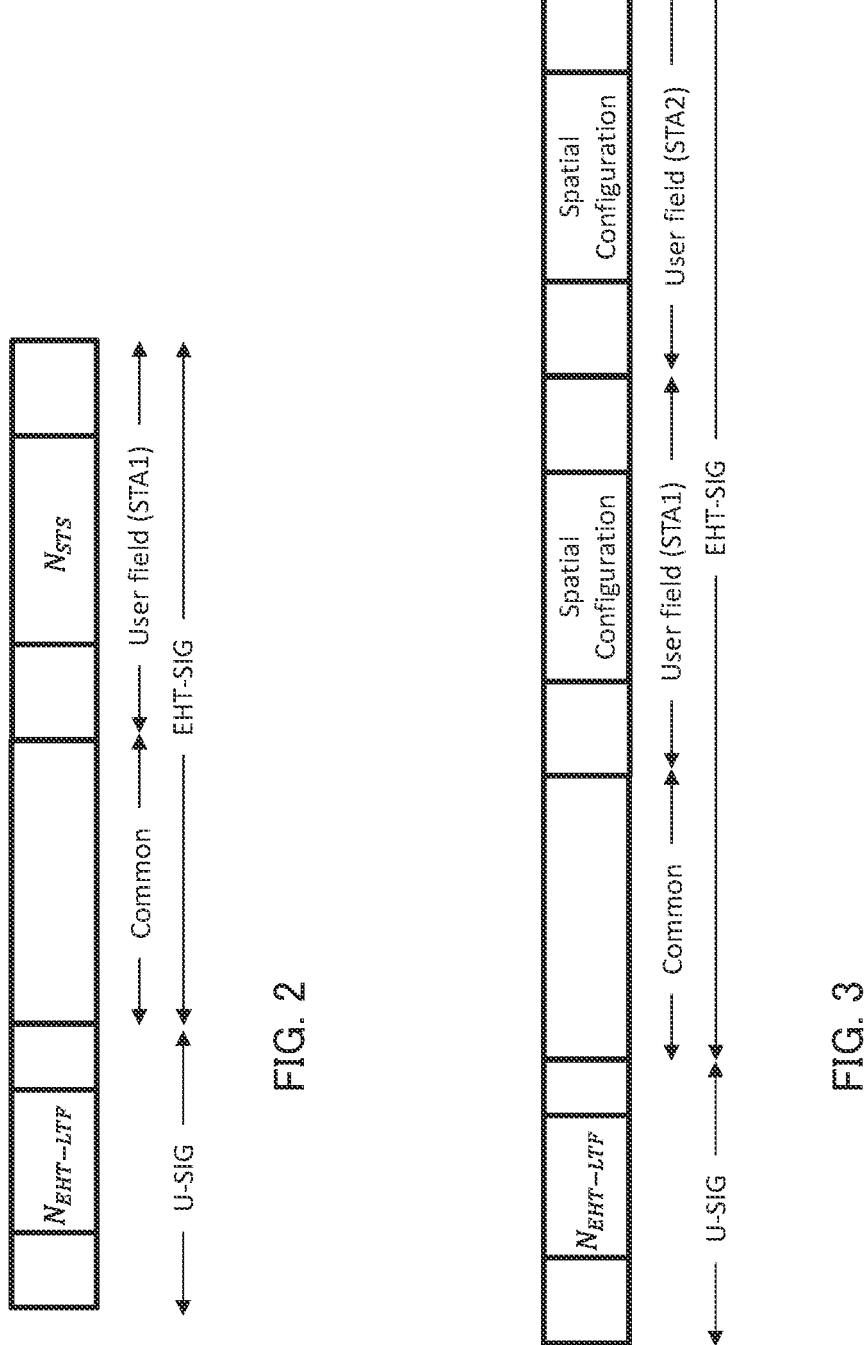
FIG. 2 illustrates exemplary U-SIG and EHT-SIG formats for a case of a single destination user of an EHT MU PPDU (non-multi-user multiple-input multiple-output (MU-MIMO))
FIG. 3 illustrates exemplary U-SIG and EHT-SIG formats for a case of more than one destination users of the EHT MU PPDU (MU-MIMO)

FIG. 2 illustrates exemplary U-SIG and EHT-SIG formats for a case of a single destination user of the EHT MU PPDU (referred to as non-multi-user multiple-input multiple-output (MU-MIMO) or single user (SU)). FIG. 3 illustrates exemplary U-SIG and EHT-SIG formats for a case of more than one destination users of the EHT MU PPDU (referred to as MU-MIMO).

As illustrated in FIGS. 2 and 3, the EHT-SIG filed includes, for example, a common field for a plurality of destination users and a user field for each destination user. In the case of non-MIMO, the EHT-SIG filed is provided with a single user field as illustrated in FIG. 2, and in the case of MU-MIMO, the EHT-SIG filed is provided with a plurality of user fields, the number of which corresponds to the number of destination users, as illustrated in FIG. 3.

In HE PPDU transmission in flax, as illustrated in FIG. 4 for example, the number of HE-LTFs included in the HE PPDU is determined based on a value of the number of spatial streams (hereinafter, represented by $N_{STS}$) indicated by a number-of-spatial-streams subfield or a spatial configuration subfield included in user information (also referred to as user field) of the HE PPDU.

Meanwhile, in EHT PPDU transmission in 11be, the number of EHT-LTF symbols included in the EHT PPDU is indicated by a number of EHT-LTF symbols subfield (hereinafter, $N_{EHT-LTF}$) included in the U-SIG, for example. In the EHT PPDU, the number of EHT-LTFs included in the EHT PPDU can be determined based on the number of spatial streams as in 11ax. Additionally, in the EHT PPDU, indicating, in $N_{EHT-LTF}$, the number of EHT-LTF symbols greater than the number of EHT-LTFs determined from the number of spatial streams realizes the EHT PPDU including more EHT-LTFs than a normal EHT PPDU.

In a case of transmitting more EHT-LTFs than normal EHT-LTFs, an access point (AP or also referred to as a "base station") may assign to each terminal (also referred to as station (STA)) twice the number of EHT-LTFs determined based on the number of spatial streams. For example, when the numbers of spatial streams [2, 1] are assigned to two STAs 1 and 2 respectively, the number of assigned EHT-LTFs may be [4, 2].

An STA that has received a signal including more EHT-LTFs than HE-LTFs, for example, compares the number of EHT-LTFs indicated by the $N_{EHT-LTF}$ subfield and the number of spatial streams indicated by the $N_{STS}$ subfield or the spatial configuration subfield, determines whether an extra LTF is included in the EHT-LTFs, and performs channel estimation using the EHT-LTFs.

Note that the $N_{EHT-LTF}$ may be included in the common field of the EHT-SIG as an extra subfield of the U-SIG.

Incidentally, there is a sounding PPDU transmitted for estimating a channel between a transmitter and a receiver in IEEE 802.11n (hereinafter, referred to as 11n), FIG. 5 illustrates an exemplary HT-SIG2 format of 11n. In 11n, when the Not Sounding subfield included in the HT-SIG2 is 0, it is transmitted as a sounding PPDU.

The sounding PPDU may include, for example, an determined based on the number of spatial streams (referred to as a data LTF (DLTF) and an LTF for transmitting an extra spatial stream (referred to as an extension spatial stream (ESS)) (referred to as an extension LTF (ELTF)). FIGS. 6 and 7 illustrate exemplary relations between the number of spatial streams ($N_{STS}/N_{ESS}$) and the number of LTFs ($N_{HT-DLTF}/N_{HT-ELTF}$). Note that a total value of the number of spatial streams and the number of extension spatial streams is sometimes required to be 4 or less and the number of transmission antennas or less, for example.

In MU-MIMO, required channel estimation accuracy may vary for each user. For example, when an equal number of spatial streams is assigned to a plurality of users in MU-MIMO (in other words, when transmit power per user is equal), a modulation and coding scheme (MCS) is possibly very different among the destination users. When the MCS is very different among the destination users, a higher-order modulation signal is more susceptible to noise than a lower-order modulation signal, and is thus more prone to a signal error.

In an embodiment of the present disclosure, channel estimation accuracy is aimed to be improved by, for example, including (or configuring) a field (or information)

related to an extra LTF for each user in a control signal with a common field (common information) and a user field (user information).

It is possible to improve channel estimation accuracy by, for example, determining extra-LTF assignment for each user according to required channel estimation accuracy for each user and performing maximal ratio combining of a plurality of channel estimates. Improved channel estimation accuracy reduces signal errors, for example, thereby enhancing the radio communication quality.

Configuration of Radio Communication System

A radio communication system according to an embodiment of the present disclosure includes one access point (AP or also referred to as "base station") and one terminal (station (STA)) at least.

For example, in downlink (DL) communication, the AP corresponds to a "downlink radio transmission apparatus", and the STA corresponds to a "downlink radio reception apparatus". In uplink (UL) communication, the AP corresponds to an "uplink radio reception apparatus", and the STA corresponds to an "uplink radio transmission apparatus". Note that the STA may be referred to as a "user apparatus" or simply a "user". The "downlink radio reception apparatus" can be positioned as a destination apparatus in the DL communication.

In an embodiment of the present disclosure, the AP may transmit a PPDU including extra-LTF control information to the STA in the DL communication, for example.

Embodiment 1

In Embodiment 1, the AP transmits a signal including an extra-LTF to the STA, for example. In the following, a method of transmitting a signal including an extra-LIP from the AP to the STA in 11be will be described as a non-limiting example.

Figure 8:
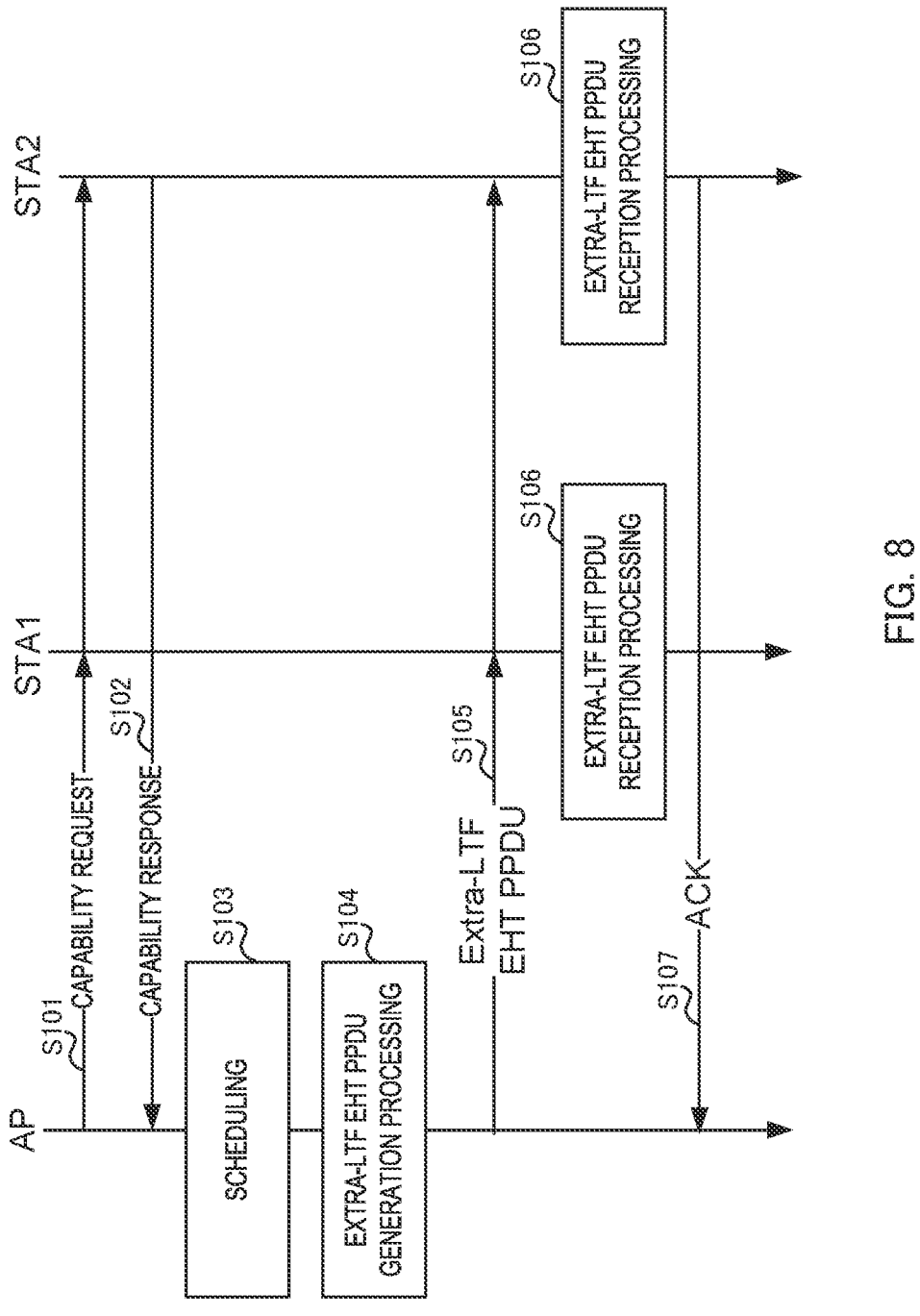
FIG. 8 is a sequence diagram describing an exemplary operation of a radio communication system according to Embodiment 1.

An exemplary operations of the AP and STA in Embodiment 1 will be described. FIG. 8 is a sequence diagram describing an exemplary operation of the radio communication system in which the AP transmits an EHT PPDU including extra-LTFs from the AP to the STAs in 11be.

The AP transmits a signal requesting transmission of capability related to the extra-LTF (capability request) to the STAs (e.g., STA 1 and STA 2) (S101). When receiving the capability request, the STAs each transmit its capability related to the extra-LTF to the source AP of the capability request, for example, as a capability response (S102).

The capability related to the extra-LTF may include, for example, at least one of information whether to support the extra-LTF the maximum number of LTFs receivable in non-orthogonal frequency-division multiple access (OFDMA) single user transmission, and the maximum number of LTFs receivable in multi-user transmission.

The AP, for example, selects the STAs to which the extra-LTFs can be transmitted based on the capabilities received from the STAs which is acquired using the capability requests, and schedules frequency resources (referred to as resource units (RUs)), a spatial multiplexing method, and a modulation method (S103). The AP, for example, also generates an EHT PPDU including extra-LTFs based on the scheduling information (S104). At this time, the AP may, for example, include information indicating extra-LTF assignment (hereinafter, sometimes referred to as "extra-LTF information") in the EHT PPDU, for example, and transmit the EHT PPDU to the STAs (S105).

The STAs that have received the extra-LTF information from the AP, for example, perform reception processing of the EHT PPDU including the extra-LTF information (S106). For example, the STAs determine whether the extra-LTFs are assigned to the EHT PPDU based on the values of $N_{STS}$ and $N_{EHT-LTF}$ acquired from a preamble portion of the EHT PPDU and the extra-LTF information, and perform channel estimation using the LTFs.

The STAs also perform equalization processing on a data portion of the EHT PPDU, for example, based on the acquired channel estimates, and demodulate and decode the data portion. Further, the STAs transmit response signals (acknowledge (referred to as ACK)) according to an error detection result of the decoded data signal, for example, to the AP (S107).

Note that the above operation example may be applied to an EHT NDP PPDU including an extra-LTF although the EHT PPDU including an extra-LTF has been described in the above example.

Figure 9:
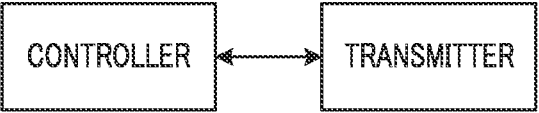
FIG. 9 is a block diagram illustrating an exemplary configuration of a part of a downlink radio transmission apparatus according to an embodiment of the present disclosure.

FIG. 9 is a block diagram illustrating an exemplary configuration of a part of downlink radio transmission apparatus (e.g., AP) 100 according to an embodiment of the present disclosure. In AP 100 (corresponding to a communication apparatus, for example) illustrated in FIG. 9, a controller (corresponding to control circuitry, for example) may set (configure), to a control signal, information on an extra reference signal (e.g., extra-LTF) for each destination apparatus (e.g., STA). A transmitter (corresponding to transmission circuitry, for example) transmits the control signal.

Figure 10:
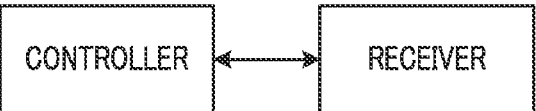
FIG. 10 is a block diagram illustrating an exemplary configuration of a part of a downlink radio reception apparatus according to an embodiment of the present disclosure.

FIG. 10 is a block diagram illustrating an exemplary configuration of a part of downlink radio reception apparatus (e.g., STA) 200 according to an embodiment of the present disclosure. In STA 200 (corresponding to a communication apparatus, for example) illustrated in FIG. 10, a receiver (corresponding to reception circuitry, for example) receives a control signal including information on an extra reference signal (e.g., extra-LTF) for each destination apparatus (e.g., STA). A controller (corresponding to control circuitry, for example) may determine the extra reference signal to be used for channel estimation based on the information on the extra reference signal.

Downlink Radio Transmission Apparatus in Embodiment 1

Figure 11:
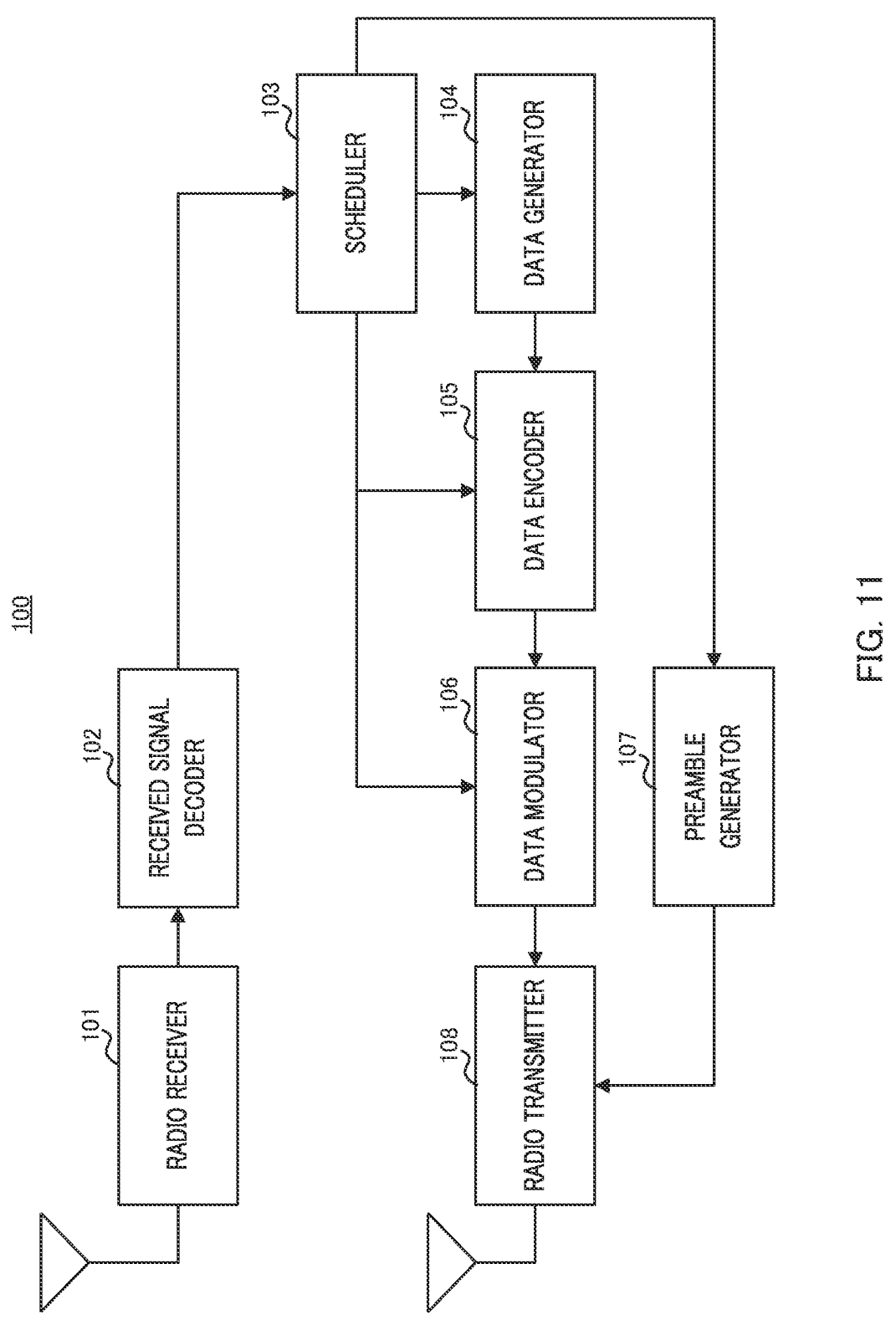
FIG. 11 is a block diagram illustrating an exemplary configuration of the downlink radio transmission apparatus according to Embodiment 1.

FIG. 11 is a block diagram illustrating an exemplary configuration of the downlink radio transmission apparatus according to Embodiment 1. Downlink radio transmission apparatus (e.g., AP) 100 illustrated in FIG. 11 may include, for example, radio receiver 101, received signal decoder 102, scheduler 103, data generator 104, data encoder 105, data modulator 106, preamble generator 107, and radio transmitter 108.

At least one of received signal decoder 102, scheduler 103, data generator 104, data encoder 105, data modulator 106, and preamble generator 107 may be included in the controller illustrated in FIG. 9, for example. Radio transmitter 108 may be included in the transmitter illustrated in FIG. 9, for example.

Radio receiver 101 receives a signal transmitted from downlink radio reception apparatus (e.g., STA) 200 (see FIG. 10) via an antenna, for example, and performs radio reception processing such as down-conversion and analog-to-digital (A/D) conversion. For example, radio receiver 101 divides the received signal subjected to the radio reception processing into a preamble portion (also referred to as a preamble signal) and a data portion (also referred to as a data signal) and outputs the divided signals to received signal decoder 102.

Received signal decoder 102 may perform demodulation processing such as the Fourier transform fast Fourier transform (FFT)) on each of the preamble signal and the data signal inputted from radio receiver 101, and extract a control signal included in each of the preamble signal and the data signal. The control signal may include, for example, information or parameters such as a frequency bandwidth (BW), MCS, or coding method.

In addition, received signal decoder 102, for example, may perform channel equalization of the data signal subjected to the Fourier transform using the control signal and a channel estimation signal acquired from the preamble signal, perform demodulation and decoding, and perform error determination such as a cyclic redundancy check (CRC).

When there is no error (i.e., decoding error) in the data signal, for example, received signal decoder 102 outputs the decoded data signal and the control signal to scheduler 103. Meanwhile, when there is an error in the data signal, for example, received signal decoder need not output the decoded data signal.

Scheduler 103 may determine scheduling information of a data signal to be transmitted to downlink radio reception apparatus (e.g., STA) 200 based on reception quality information of the data signal outputted from received signal decoder 102 or the capability of downlink radio reception apparatus 200, for example.

The reception quality information may include, for example, information such as a packet error rate (PER) and RSSI. The scheduling information may include, for example, information or parameters such as an RUT, MCS, error correction coding method, and extra-LTF information. The scheduling information may be outputted to data generator 104, data encoder 105, data modulator 106 and preamble generator 107, for example.

Data generator 104, for example, generates a data sequence to be transmitted to downlink radio reception apparatus 200 based on the scheduling information outputted from scheduler 103, and outputs the data sequence to data encoder 105.

Data encoder 105 performs encoding based on, for example, the data sequence outputted from data generator 104 and the scheduling information (e.g., error correction coding method and MCS) outputted from scheduler 103. The encoded data may be outputted to data modulator 106, for example.

Data modulator 106 performs modulation and the inverse Fourier transform (e.g., inverse fast Fourier transform (IFFT)) based on, for example, the encoded data outputted from data encoder 105 and the scheduling information (e.g., modulation method) outputted from scheduler 103. The modulated data signal may be outputted to radio transmitter 108, for example.

Preamble generator 107 generates a preamble signal including an extra-LTF or control information related to an extra-LTF (e.g., extra-LTF assignment information), for example, based on the scheduling information outputted from scheduler 103. The preamble signal, for example, may be modulated and subjected to IFFT processing in preamble generator 107 and outputted to radio transmitter 108.

Radio transmitter 108, for example, adds the preamble signal outputted from preamble generator 107 to the data signal outputted from data modulator 106 to generate a radio frame (also referred to as a packet signal). Further, radio transmitter 108 performs radio transmission processing such as digital-to-analog (D/A) conversion and up-conversion to a carrier frequency on the radio frame, for example, and transmits the signal subjected to the radio transmission processing to downlink radio reception apparatus 200 via the antenna.

Downlink Radio Reception Apparatus in Embodiment 1

Figure 12:
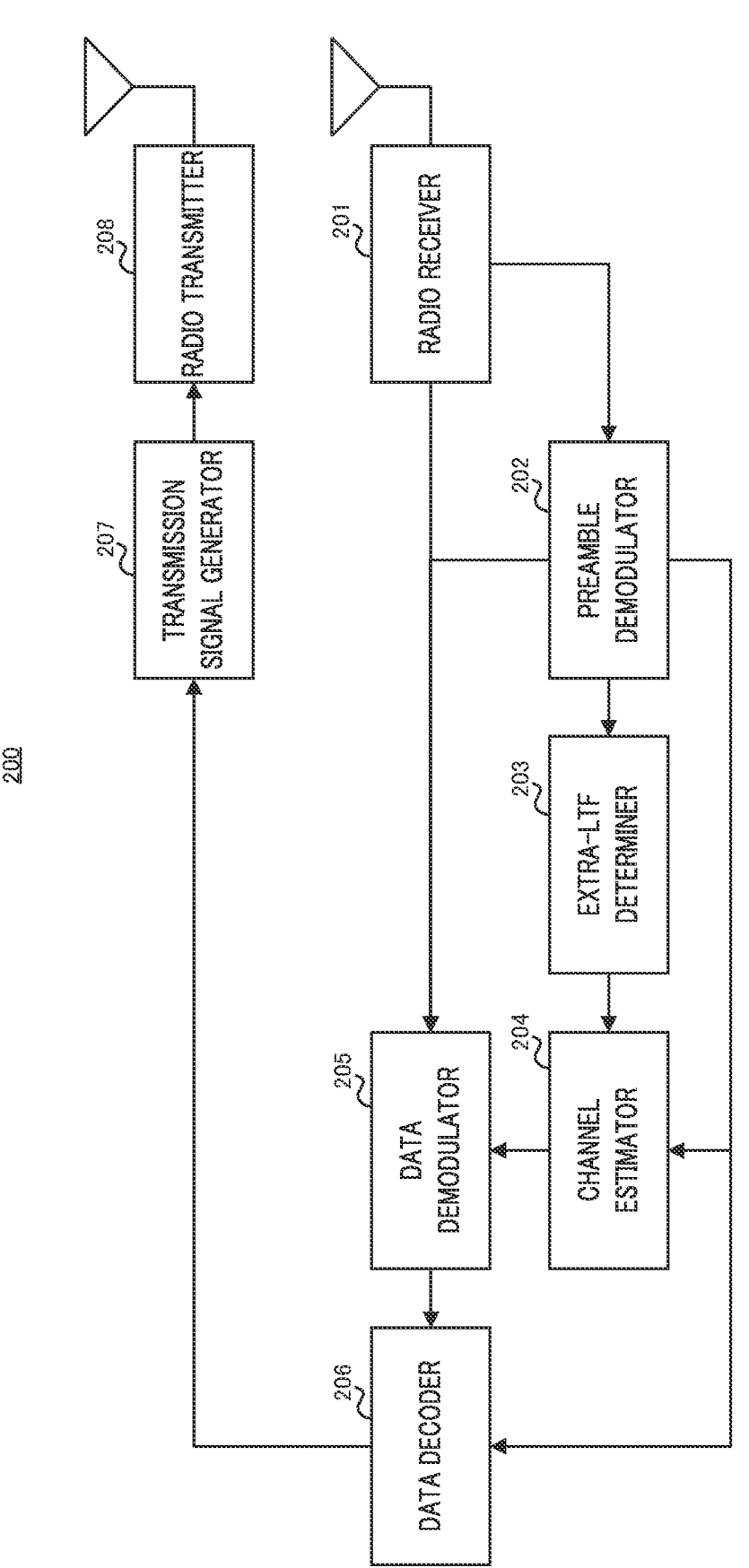
FIG. 12 is a block diagram illustrating an exemplary configuration of the downlink radio reception apparatus according to Embodiment 1.

FIG. 12 is a block diagram illustrating an exemplary configuration of the downlink radio reception apparatus according to Embodiment 1. Downlink radio reception apparatus (e.g., STA) 200 illustrated in FIG. 12 may include, for example, radio receiver 201, preamble demodulator 202, extra-LTF determiner 203, channel estimator 204, data demodulator 205, data decoder 206, transmission signal generator 207, and radio transmitter 208.

At least one of preamble demodulator 202, extra-LTF determiner 203, channel estimator 204, data demodulator 205, data decoder 206, and transmission signal generator 207 may be included in the controller illustrated in FIG. 10, for example. Radio receiver 201 may be included in the receiver illustrated in FIG. 10, for example.

For example, radio receiver 201 may receive a signal transmitted from downlink radio transmission apparatus (e.g. AP) 100 via an antenna, for example, and perform radio reception processing such as down-conversion and A/D conversion. In addition, radio receiver 201, for example, outputs a data signal extracted from the received signal subjected to the radio reception processing to data demodulator 205, and outputs a preamble signal to preamble demodulator 707.

Preamble demodulator 202, for example, performs demodulation processing such as the Fourier transform (e.g., FFT) on the preamble signal outputted from radio receiver 201 to extract a control signal to be used for demodulating and decoding the data portion. The control signal may include, for example, information or parameters such as a BW, MCS, error correction coding method, and extra-LTF information. For example, preamble demodulator 202 may output the extracted control information to data demodulator 205, data decoder 206, extra-LTF determiner 203, and channel estimator 204.

Extra-LTF determiner 203, for example, determines whether an extra-LTF is included in the preamble of the received signal based on the extra-LTF information outputted from preamble demodulator 202. The determined information (hereinafter, sometimes referred to as extra-LTF determination information) may be outputted to channel estimator 204, for example.

Channel estimator 204 performs channel estimation using, for example, a reference signal (e.g., LTF) included in the preamble. For example, when an extra-LTF is assigned based on the extra-LTF determination information outputted from extra-LTF determiner 203, channel estimator 204 performs channel estimation using the extra-LTF in addition to an EHT-LTF (referred to as an original LTF) determined based on the number of spatial streams assigned to the downlink radio reception apparatus.

Channel estimator 204 performs maximal ratio combining of channel estimates estimated by using, for example, the original LTF and extra-LTF, and outputs the combined channel estimate to data demodulator 205. Note that a power correction value may be added to the combined channel estimate in order to correct the power difference between the combined channel estimate and the data portion. When an extra-LTF is not assigned, channel estimator 204 need not perform channel estimation using an extra-LTF.

Data demodulator 205, for example, performs processing such as the Fourier transform (e.g., FFT) on the data signal outputted from radio receiver 201, and demodulates the data signal using the control information outputted from preamble demodulator 202 and the channel estimates outputted from channel estimator 204. The demodulated data signal may be outputted to data decoder 206, for example.

Data decoder 206, for example, decodes the demodulated data signal outputted from data demodulator 205 using the control information outputted from preamble demodulator 202, performs error determination such as CRC, and outputs error determination info nation to transmission signal generator 207 as a determination result.

Transmission signal generator 207 generates a response signal (ACK or block ACK (referred to as BA)) based on, for example, the error determination information outputted from the data decoder. Further, transmission signal generator 207, for example, generates a radio frame by adding a preamble signal to the data signal, and outputs the radio frame to radio transmitter 208.

Radio transmitter 208, for example, performs radio transmission processing such as D/A conversion and up-conversion to a carrier frequency on the radio frame outputted from transmission signal generator 207, and transmits the signal subjected to the radio transmission processing to downlink radio transmission apparatus 100 via the antenna.

Exemplary Operations

Next, a description will be given of exemplary operations of downlink radio transmission apparatus (e.g., AP) 100 and downlink radio reception apparatus (e.g., STA) according to Embodiment 1.

In an embodiment of the present disclosure, a control signal (also referred to as control information) transmitted from downlink radio transmission apparatus 100 to downlink radio reception apparatus 200 may include common information for a plurality of users and individual user information for each of the plurality of users.

The control signal may include, for example, individual extra-LTF information for users (e.g., downlink radio reception apparatuses 200). The control information may be, for example, a SIG field (U-SIG or EHT-SIG) of an EHT PPDU or a trigger frame. The extra-LTF information may include, for example, information r parameters indicating at least one of the presence or absence of extra-LTF assignment and the number of assigned extra-LTFs.

Method 1

Figure 13:
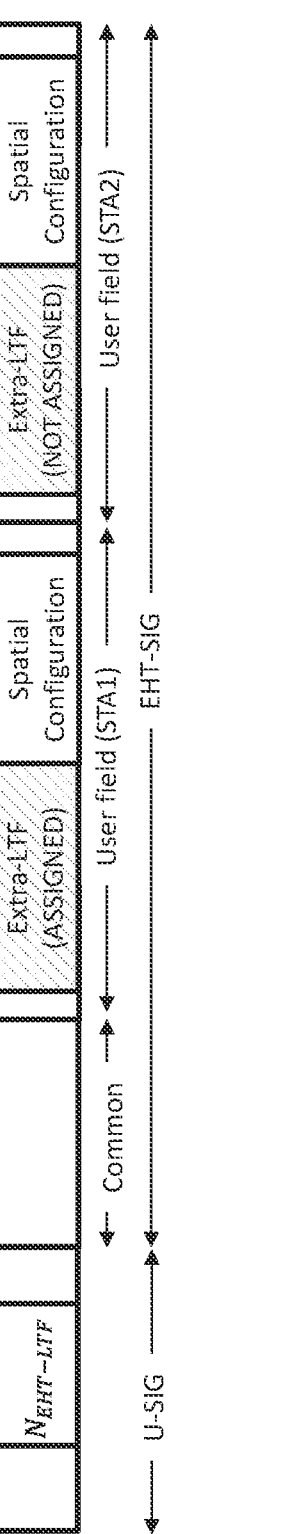
FIG. 13 illustrates an exemplary EHT-SIG format including extra-LTF subfields.

In Method 1, for example, each of the user information may include a subfield for indicating the extra-LTF information. For example, as illustrated in FIG. 13, each of the user fields of the EHT-SIG may include an extra-LTF subfield indicating the extra-LTF assignment. Indication methods using the extra-LTF subfield will be described later in specific examples 1 to 3 of Method 1.

In an EHT-LTF, for example, a mapping matrix (referred to as P-matrix) is added in order to multiplex a plurality of EHT-LTF symbols regardless of the presence or absence of an extra-LTF. In 11ac/ax, for example, the P-matrix to be used is determined according to the number of LTFs ($N_{HE-LTF}$) as represented in Expression 1. In 11n, for example, a P-matrix of $P_{4\times4}$ is used. $P_{4\times4}$ is represented by, for example, Expression 2. Column components of a P-matrix correspond to respective LTF symbols. Meanwhile, row components of a P-matrix correspond to spatial streams, and the row components are multiplexed to respect LTF symbols.

[1]

$$P_{HE-LTF} = \begin{cases} P_{4\times4}, N_{HE-LTF} = 1,2,4 & \text{(Expression 1)} \\ P_{6\times6}, N_{HE-LTF} = 6 \\ P_{8\times8}, N_{HE-LTF} = 8 \end{cases}$$

[2]

$$P_{4\times4} = \begin{bmatrix} 1 & -1 & 1 & 1 \\ 1 & 1 & -1 & 1 \\ 1 & 1 & 1 & -1 \\ -1 & 1 & 1 & 1 \end{bmatrix} \quad \text{(Expression 2)}$$

For example, a P-matrix to be added to EHT-LTFs including an extra-LTF may be determined based on the number of EHT-LTFs. The number of EHT-LTFs may be obtained, for example, by adding the number of extra-LTFs to the number of EHT-LTFs determined based on the total number of spatial streams transmitted in MU-MIMO.

Figure 14:
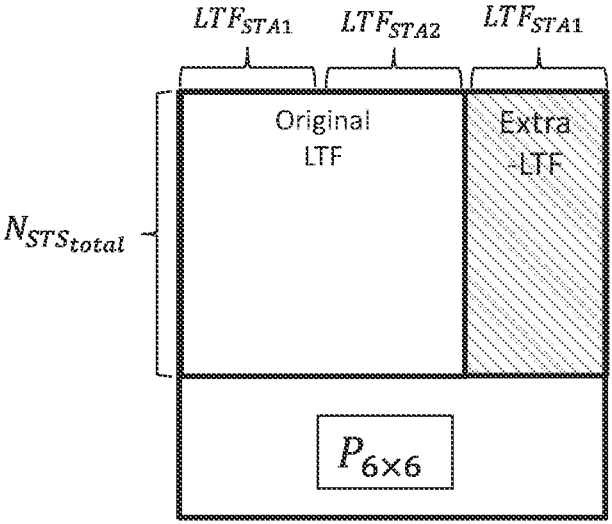
FIG. 14 illustrates an exemplary method of determining a mapping matrix (P-matrix) from the number of LTFs obtained by adding the number of extra-LTFs to the number of LTFs determined based on the total number of spatial streams.

FIG. 14 illustrates an exemplary P-matrix added to EHT-LTFs in a case where two spatial streams are assigned to each of STA 1 and STA 2 and two extra-LTFs are assigned to STA 1. In this case, the AP adds elements in rows 1 to 4 and columns 1 to 4 of the P-matrix of 6 rows and 6 columns (referred to as $P_{6\times6}$) to the original LTFs, and adds elements in rows 1 to 4 and columns 5 to 6 of $P_{6\times6}$ to the extra-LTFs, for example.

STA 1 performs maximal ratio combining of a channel estimate obtained from the original LTF and a channel estimate obtained from the extra-LTF, for example, and uses it for equalization processing of a data portion.

Figure 15:
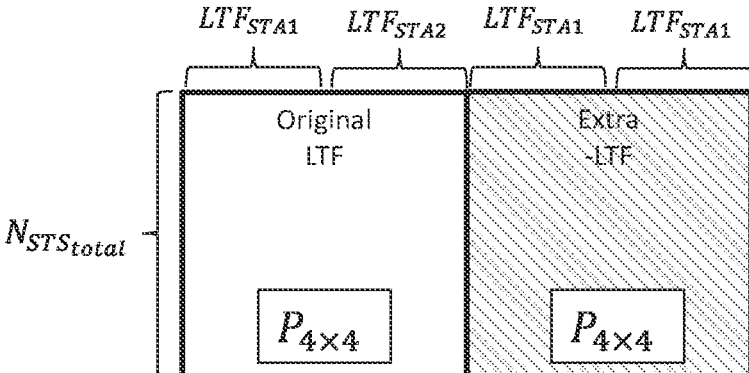
FIG. 15 illustrates an exemplary method of using a plurality of P-matrices obtained from the number of LTFs determined based on the total number of spatial streams.

For the P-matrix added to the EHT-LTF including the extra-LTF, for example, a plurality of original LTFs determined based on the total number of spatial streams transmitted by MU-MIMO may be used. FIG. 15 illustrates exemplary P-matrices added to EHT-LTFs in a case where two spatial streams are assigned to each of STA 1 and STA 2 and four extra-LTFs are assigned to STA 1.

In this case, the AP adds a P-matrix of 4 rows and 4 columns (referred to as $P_{4\times4}$), for example, to the original LTFs, and adds another P-matrix $P_{4\times4}$ to the extra-LTFs.

STA 1 performs maximal ratio combining of a channel estimate obtained from the original LTFs and two channel estimates obtained from the extra-LTFs, for example, and uses it for equalization processing of a data portion.

Assigning an extra-LTF to a particular user as in Method 1 enables channel estimation using more LTFs than in the conventional technique, thereby improving channel estimation accuracy by maximal ratio combining.

Specific Example 1 of Method 1

Figure 16:
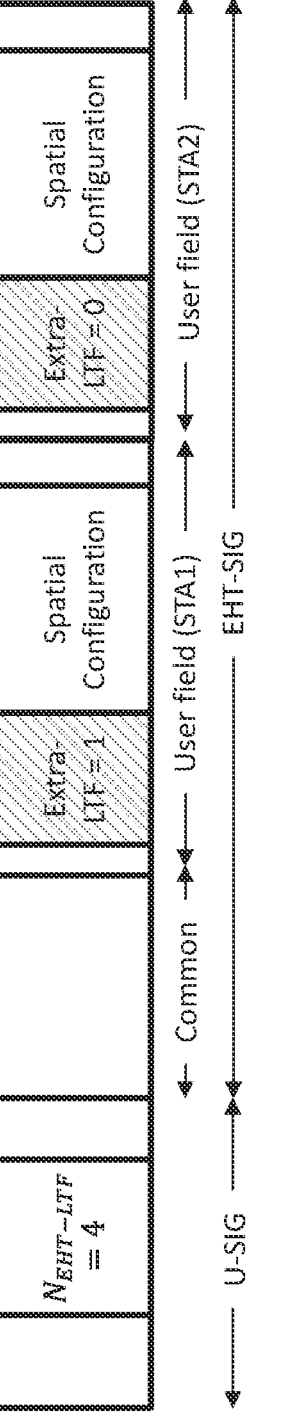
FIG. 16 illustrates an exemplary EHT-SIG format for indicating the presence or absence of extra-LTFs in each user information.

In specific example 1 of Method 1, the extra-LTF information indicates, for example, the presence or absence of extra-LTFs. FIG. 16 illustrates an exemplary EHT-SIG format for indicating the presence or absence of extra-LTFs in each user information.

The extra-LTF subfield may be a subfield of 1 bit, for example. For example, when extra-LTF=1, it indicates that the extra-LTF is assigned, and when extra-LTF=0, it indicates that no extra-LTF is assigned.

Figure 17:
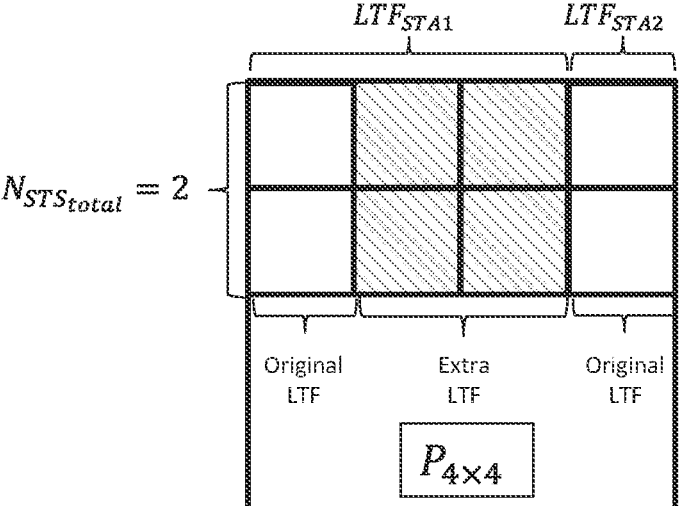
FIG. 17 illustrates an exemplary EHT-SIG format for indicating the number of extra-LTFs in each user information.

In specific example 1 of Method 1, the first STA may determine the number of extra-LTFs for the first STA by, for example, also referring to the user information addressed to another second STA. For example, FIG. 16 illustrates an example where one spatial stream is assigned to each of STA 1 and STA 2, and two extra-LTFs are assigned to STA 1. FIG. 17 illustrates exemplary LTF assignment at this time.

STA 1 and STA 2 determine that one spatial stream is assigned to each of STA 1 and STA 2 from the spatial configuration subfields (in other words, determine that the total number of assigned spatial streams=2).

In this case, a single original LTF is assigned to each of STA 1 and STA 2. STA 1, for example, refers to the extra-LTF in the user field of STA 2, and identities that no extra-LTF is assigned to STA 2. In addition, STA 1 determines the number of extra-LTFs assigned to STA 1 by, for example, subtracting the total number of spatial streams (=2) indicated in the spatial configuration subfield from the number of EHT-LTFs indicated in the $N_{EHT-LTF}$ subfield ($N_{EHT-LTF}$=4 in this example), and derives the EHT-LTF indices (1 to 3) to be referred to.

Meanwhile, STA 2 identifies that extra-LTFs have been assigned to STA 1 based on the extra-LTF in the user field of STA 1, for example. Similar to STA 1, STA 2 calculates the EHT-LTF indices assigned to STA 1 from the difference between the number of EHT-LTFs and the total spatial streams, for example, and derives the EHT-LTF index (4) to which STA 2 refers.

Specific Example 2 of Method 1

Figure 18:
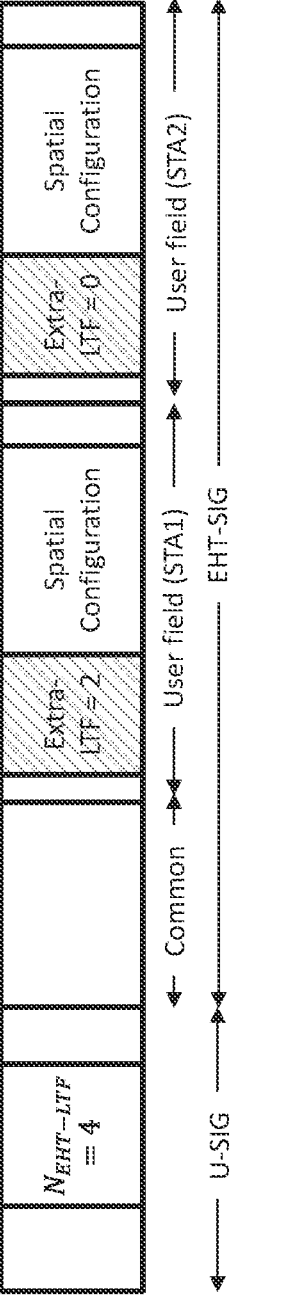
FIG. 18 illustrates an exemplary EHT-SIG format for indicating the number of extra-LTFs by a multiple of the number of initial EHT-LTFs in each user information.

In specific example 2 of Method 1, the extra-LTF information indicates, for example, the number of extra-LTFs. FIG. 18 illustrates an exemplary EHT-SIG format for indicating the number of extra-LTFs in each user information. FIG. 18 illustrates an example where one spatial stream is assigned to each of STA 1 and STA 2, and two extra-LTFs are assigned to STA 1.

In this case, the indication method of the number of extra-LTFs may include indicating the number of extra-LTFs by, for example, each extra-LTF subfield. The indication method of the number of extra-LTFs may also include indicating the number of available extra-LTFs (for example, the number of extra-LTFs is selected from [0, 2, 4, 8]).

Specific Example 3 of Method 1

Figure 19:
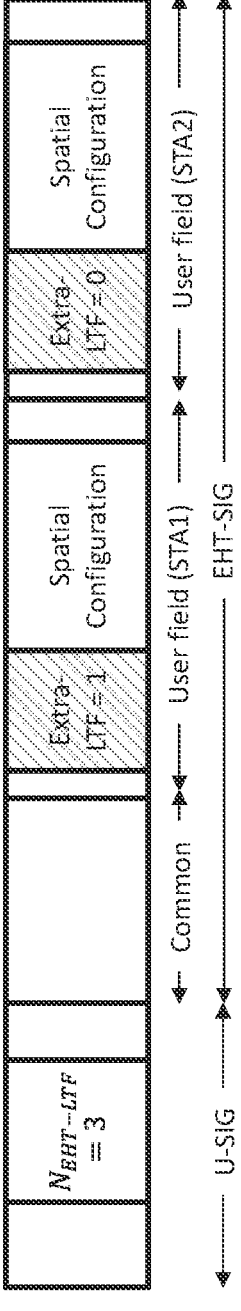
FIG. 19 illustrates an exemplary EHT-SIG format for indicating extra-LTF assignment by a bitmap in common information.

In specific example 3 of Method 1, a multiple of the number of initial (or original) LTFs is indicated as the extra-LTF information. FIG. 19 illustrates an exemplary EHT-SIG format for indicating the number of extra-LTFs by a multiple of the number of initial EHT-LTFs in each user information. FIG. 19 illustrates an example where one spatial stream is assigned to each of STA 1 and STA 2, and one extra-LTF is assigned to STA 1.

In this case, the extra-LTF subfield included in each user information may be a subfield of 1 bit, and when extra-LTF=1, LTFs twice as many as the number of initial LTFs may be assigned (in other words, when extra-LTF=0, no extra-LTF is assigned).

Note that the extra-LTF subfield is not limited to a subfield of 1 bit, and LTFs three, four, or more times as many as the number of initial LTFs may be indicated by increasing the number of bits of the extra-LTF subfield.

Method 2

In Method 2, the configuration (or format) of the control information is switched depending on, for example, the presence or absence of extra-LTFs. For example, an extra-LTF present subfield is added to the and the presence or absence of extra-LTFs is indicated.

For example, when a transmission signal includes one or more users to which an extra-LTF is assigned, "extra-LTF present=1" is indicated, and when it includes no user to which an extra-LTF is assigned, "extra-LTF present=0" is indicated. The presence or absence of extra-LTFs may be indicated using any of specific examples 1 to 3 of Method 1.

By switching a configuration of the EHT-SIG according to whether a transmission signal includes a user to which an extra-LTF is assigned as in Method 2, signaling overhead can be reduced when no extra-LTF is used.

Specific Example 1 of Method 2

In specific example 1 of Method 2, when a transmission signal includes a user to which an extra-LTF is assigned, for example, an extra-LTF bitmap may be added to the common information, and the presence or absence of extra-LTFs for each user may be indicated by the extra-LTF bitmap, in other words, when a transmission signal includes no user to which an extra-LTF is assigned, for example, the extra-LTF bitmap need not be included in the common information.

Figure 20:
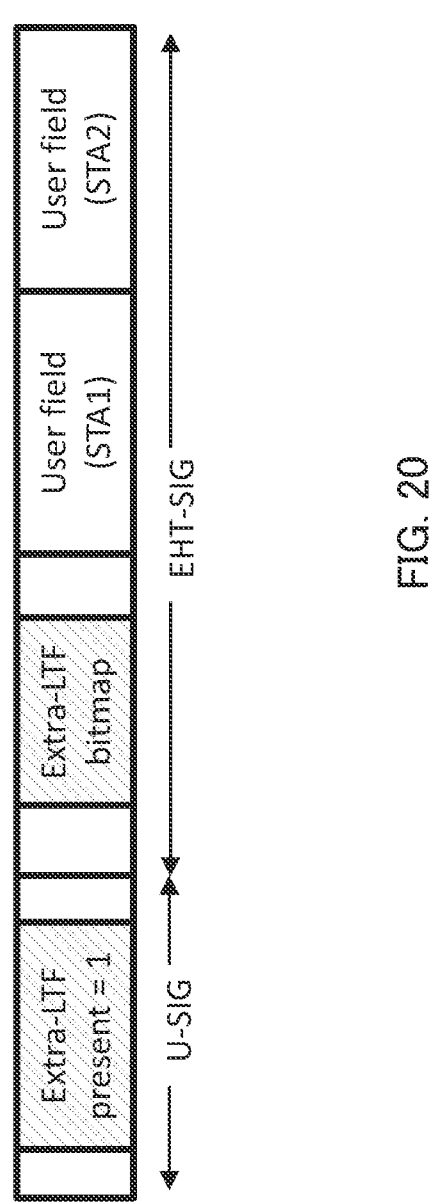
FIG. 20 illustrates an exemplary EHT-SIG format for indicating whether extra-LTF information is included in user information in the common information.

FIG. 20 illustrates an exemplary EHT-SIG format for indicating extra-LTF assignment by a bitmap in the common information.

The extra-LTF bitmap may be, for example, a variable-length bitmap determined based on the number of user information portions included in the EHT-SIG. Alternatively, the extra-LTF bitmap may be, for example, a fixed-length bitmap based on the maximum number of multiplexed users in MU-MIMO.

For example, the extra-LTF bitmap may indicate the presence or absence of a user-specific extra-LTF in 1 bit as in specific example 1 of Method 1, or may indicate the number of user-specific extra-LTFs in up to 3 bits as in specific example 2 of Method 1. Alternatively, as in specific example 3 of Method 1, 1 bit may be used to indicate the assignment of LTFs that are multiples of the number of spatial streams indicated in the $N_{STS}$.

Specific example 1 of Method 2 makes it possible to determine the extra-LTF assignment for other users by referring to the extra-LTF bitmap (in other words, it eliminates the need for referring to the user information of other users), thereby reducing processing time.

Specific Example 2 of Method 2

Figure 21:
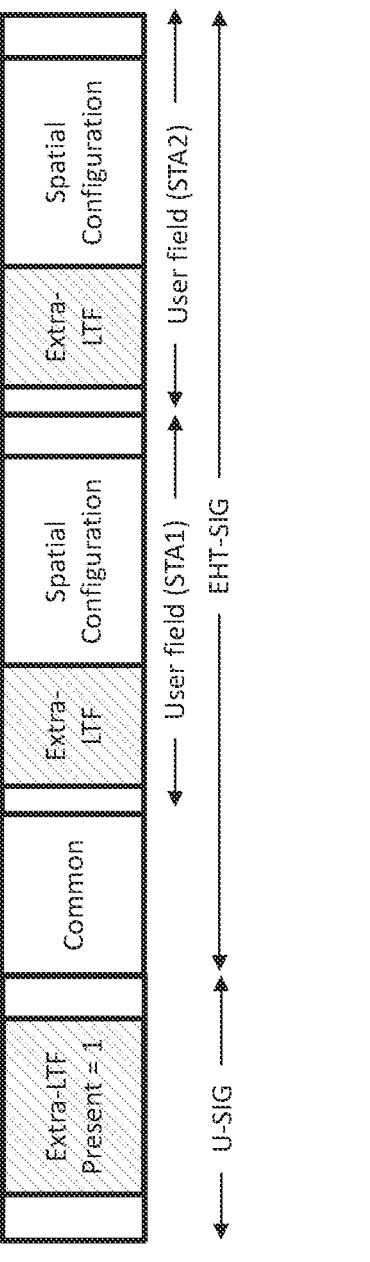
FIG. 21 illustrates an exemplary table of a modulation and coding scheme (MCS) to which a combination of lower-order modulation and an extra-LTF is added in a case of a single user (SU)

In specific example 2 of Method 2, when a transmission signal includes a user to which an extra-LTF is assigned, for example, the extra-LTF information is added to the user information, and the presence or absence of extra-LTF for each user is indicated. FIG. 21 illustrates an exemplary EHT-SIG format for indicating whether the extra-LTF information is included in the user information in the common information.

For example, when a transmission signal includes a user to which an extra-LTF is assigned, an extra-LTF subfield for indicating the extra-LTF information is added to each user information. In other words, when a transmission signal includes no user to which an extra-LTF is assigned, for example, the extra-LTF subfield need not be included in each user information.

According to specific example 2 of Method 2, signaling overhead can be further reduced compared to specific example 1 of Method which the extra-LTF assignment is indicated by a bitmap, in a case of fewer destination users.

Specific Example 3 of Method 2

In specific example 3 of Method 2, for example, the extra-LTF indication method is changed according to the number of destination users. For example, it is assumed that the common information includes a fixed-length extra-LTF bitmap based on the maximum number of multiplexed users in MU-MIMO. In this case, when the number of destination users of a transmission signal including an extra-LTF is equal to the maximum number of multiplexed users in MU-MIMO, the presence or absence of extra-LTFs for user may be indicated by the extra-LTF bitmap as in specific example 1 of Method 2. Meanwhile, when the number of destination users of a transmission signal including an extra-LTF is fewer than the maximum number of multiplexed users in MU-MIMO, for example, the presence or absence of extra-LTFs may be indicated in each user information as in specific example of Method 2.

According to specific example 3 of Method 2, changing the extra-LTF indication method according to the number of destination users of a transmission signal including an extra-LTF makes it possible to select an efficient signaling method flexibly and optimize the signaling method.

Method 3 in Method 3, the extra-LTF information is indicated in the user information by combining the extra-LTF information and MCS, for example. When it is indicated by combining the extra-LTF and MCS, for example, it may be indicated by combining a modulation method and the number of extra-LTFs for each MCS index (Example 1), or it may be indicated by combining a modulation method and a multiple of the number of original LTFs for each MCS index (Example 2).

For example, in a case of transmission intended for a single user (SU), a combination of lower-order modulation and the extra-LTF may be added to an MCS table separately from Example 1 and Example 2, as illustrated in FIG. 22. For example, in a case of transmission intended for multiple users (MU), a combination of higher-order modulation and the extra-LTF may be added to an MCS table separately from Example 1 and Example 2, as illustrated in FIG. 23.

Note that the combination of the extra-LTF information and MCS illustrated in each of FIG. 22 (Example 1) and FIG. 23 (Example 2) is a non-limiting example, and another combination may be applied. In addition, the combination of the extra-LTF information and MCS may be changed in accordance with, for example, the number of destination users.

Combining the extra-LTF information and MCS as in Method 3 enables extra-LTF information indication without increasing signaling for indicating the extra-LTF information.

Embodiment 2

Exemplary methods of assigning a user to different time symbols of LTFs including an extra-LTF have been described in Embodiment 1. In Embodiment 2, an exemplary method of assigning a plurality of row components of a P-matrix to a single spatial stream using code multiplexing, for example.

Downlink Radio Transmission Apparatus of Embodiment 2

Figure 24:
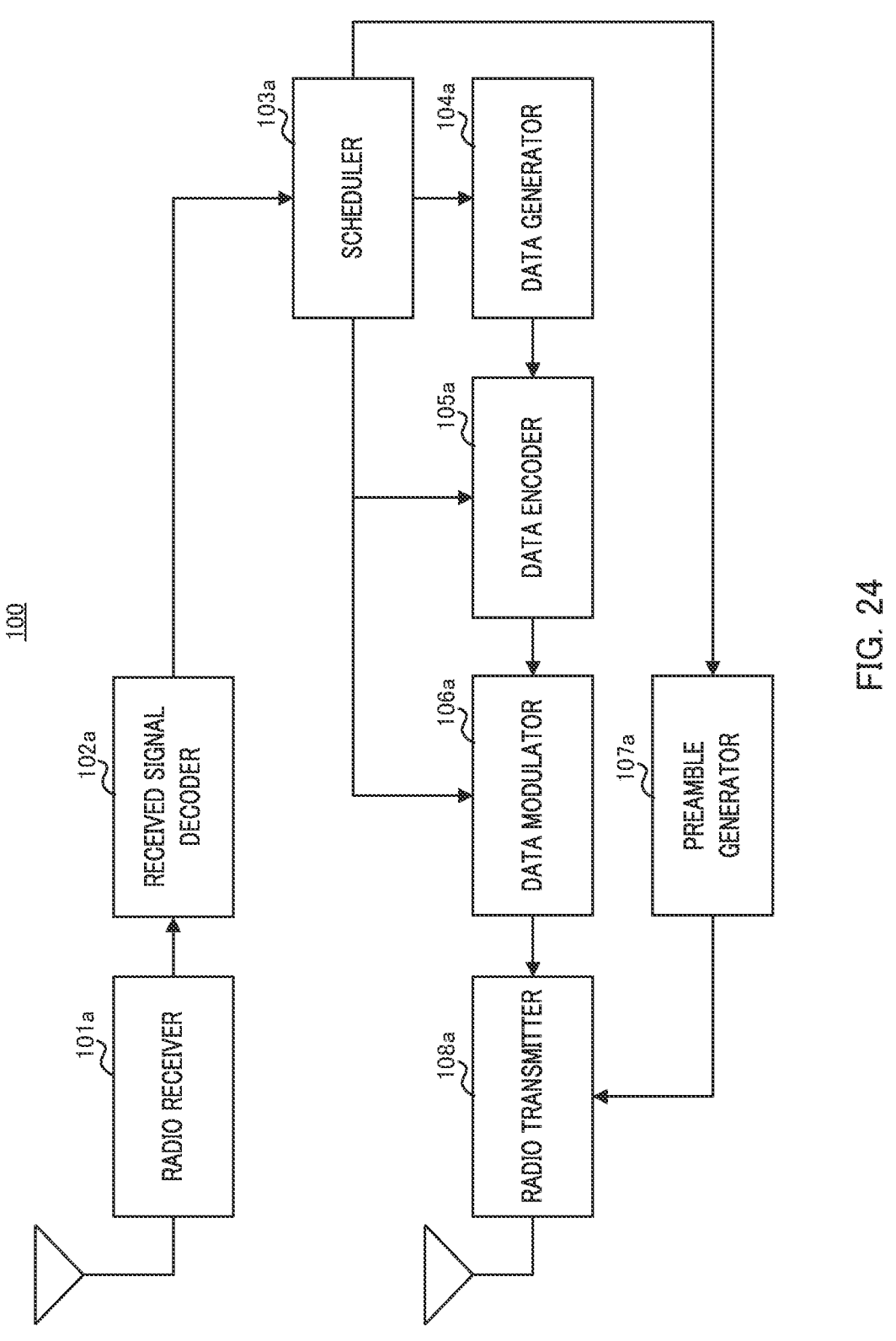
FIG. 24 is a block diagram illustrating an exemplary configuration of the downlink radio transmission apparatus according to Embodiment 2.

FIG. 24 is a block diagram illustrating an exemplary configuration of the downlink radio transmission apparatus according to Embodiment 2. Downlink radio transmission apparatus (e.g., AP) 100 illustrated in FIG. 24 may include, for example, radio receiver 101a received signal decoder 102a, scheduler 103a, data generator 104a, data encoder 105a, data modulator 106a, preamble generator 107a, and radio transmitter 108a.

At least one of received signal decoder 102a, scheduler 103a, data generator 104a, data encoder 105a, data modulator 106a, and preamble generator 107a may be included in the controller illustrated in FIG. 9, for example. Radio transmitter 108a may be included in the transmitter illustrated in FIG. 9, for example.

Radio receiver 101a receives a signal transmitted from downlink radio reception apparatus (e.g., STA) 200 aria an antenna, for example, and performs radio reception processing such as down-conversion and A/D conversion. For example, radio receiver 101a divides the received signal subjected to the radio reception processing into a preamble portion and a data portion and outputs the divided signals to received signal decoder 102a.

For example, received signal decoder 102a may perform a demodulation processing such as the Fourier transform (e.g., FFT) on the preamble signal and the data signal inputted from radio receiver 101a, and extract a control signal included in each of the preamble signal and the data signal. The control signal may include, for example, information or parameters such as a BW, MCS, or coding method. In addition, received signal decoder 102a, for example, may perform channel equalization of the data signal subjected to the Fourier transform using the control signal and a channel estimation signal acquired from the preamble signal, perform demodulation and decoding, and perform error determination such as CRC.

When there is no error (i.e., decoding error) in the data signal, for example, received signal decoder 102a outputs the decoded data signal and the control signal to scheduler 103a.

Scheduler 103a may determine scheduling information of a data signal to be transmitted to downlink radio reception apparatus (e.g., STA) 200 based on reception quality information of the data signal outputted from received signal decoder 102a or the capability of downlink radio reception apparatus 200, for example.

The reception quality information may include, for example, information such as a PER and RSSI. The scheduling information may include, for example, information or parameters such as an RU, MCS, error correction coding method, and extra-LTF information. The scheduling information may be outputted to data generator 104a, data encoder 105a, data modulator 106a, and preamble generator 107a, for example.

Data generator 104a, for example, generates a data sequence to be transmitted to downlink radio reception apparatus 200 based on the scheduling information outputted from scheduler 103a, and outputs the data sequence to data encoder 105a.

Data encoder 105a performs encoding based on, for example, the data sequence outputted from data generator 104a and the scheduling information (e.g., error correction coding method and MCS) outputted from scheduler 103a. The encoded data may be outputted to data modulator 106a, for example.

Data modulator 106a, for example, performs spatial multiplexing by adding a spatial weight matrix outputted from scheduler 103a to the encoded data outputted from data encoder 105a. Data modulator 106a, for example, also performs modulation and the inverse Fourier transform (e.g., IFFT) on the spatially multiplexed data based on the scheduling information (e.g., modulation method) outputted from scheduler 103a, and outputs the data signal to radio transmitter 108a.

Preamble generator 107a, for example, adds to an LTF a P-matrix and a spatial weight matrix generated based on the scheduling information outputted from scheduler 103a. In addition, preamble generator 107a generates a preamble signal including information on the P-matrix added to the LTF (referred to as P-matrix information), for example, and outputs the preamble signal subjected to modulation and IFFT processing to radio transmitter 108.

Radio transmitter 108a, for example, adds the preamble signal outputted from preamble generator 107a to the data signal outputted from data modulator 106a to generate a radio frame (also referred to as a packet signal). Further, radio transmitter 108a performs radio transmission processing such as D/A conversion and up-conversion to a carrier frequency on the radio frame and transmits the signal subjected to the radio transmission processing to downlink radio reception apparatus 200 via the antenna.

Downlink Radio Reception Apparatus of Embodiment 2.1

Figure 25:
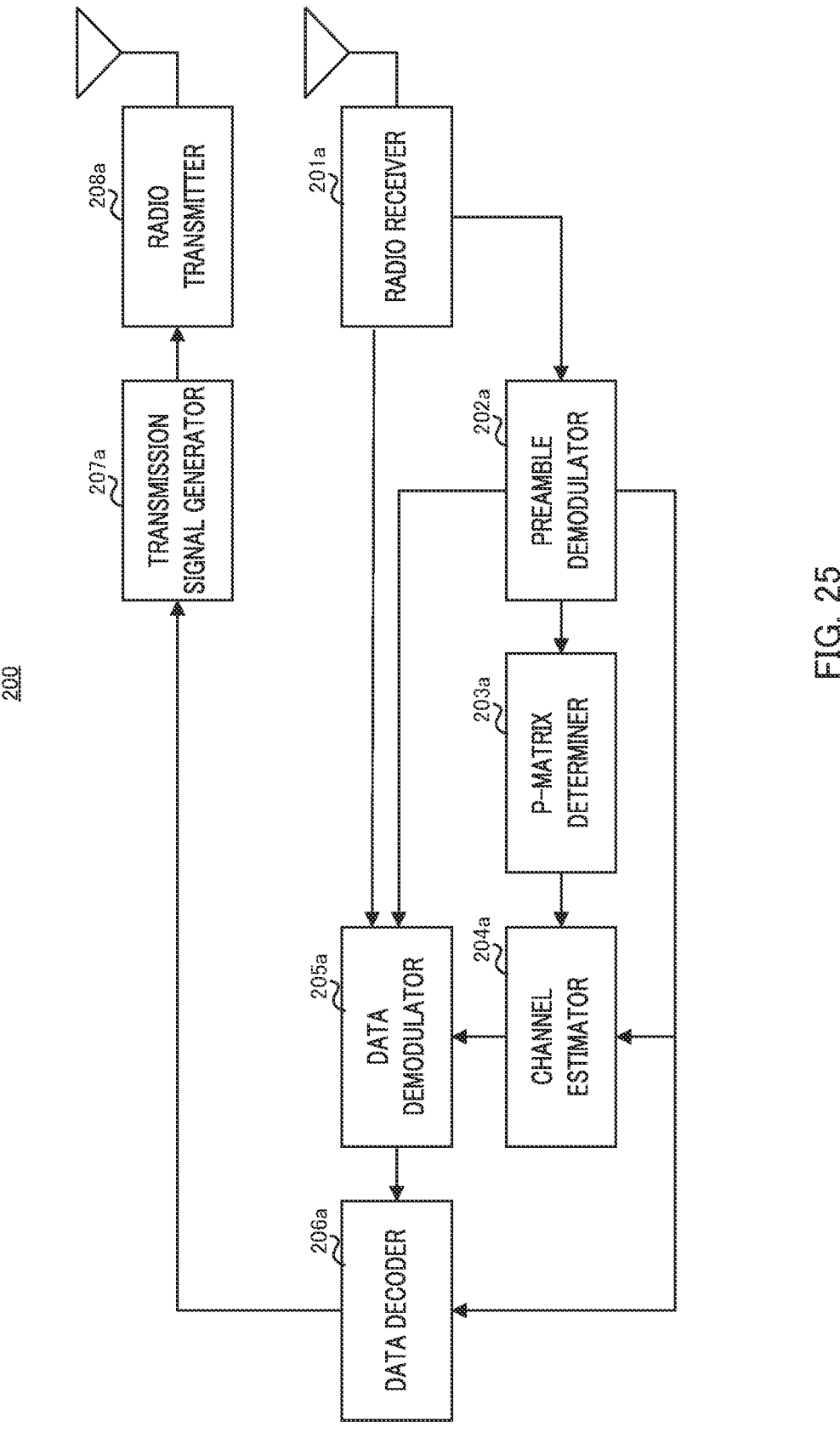
FIG. 25 is a block diagram illustrating an exemplary configuration of the downlink radio reception apparatus according to Embodiment 2.

FIG. 25 is a block diagram illustrating an exemplary configuration of the downlink radio reception apparatus according to Embodiment 2. Downlink radio reception apparatus (e.g., STA) 200 illustrated in FIG. 25 may include, for example, radio receiver 201a, preamble demodulator 202a, P-matrix determiner 203a, channel estimator 204a, data demodulator 205a, data decoder 206a, transmission signal generator 207a, and radio transmitter 208a.

At least one of preamble demodulator 202a, P-matrix determiner 203a, channel estimator 204a, data demodulator 205a, data decoder 206a, and transmission signal generator 207a may be included in the controller illustrated in FIG. 10, for example. Radio receiver 201a may be included in the receiver illustrated in FIG. 10, for example.

For example, radio receiver 201a may receive a signal transmitted from downlink radio transmission apparatus (e.g., AP) 100 via an antenna, for example, and perform radio reception processing such as down-conversion and A/D conversion. In addition, radio receiver 201a, for example, outputs a data signal extracted from the received signal subjected to the radio reception processing to data demodulator 205a, and outputs a preamble signal to preamble demodulator 202a.

Preamble demodulator 202a for example, performs demodulation processing such as the Fourier transform (e.g., FFT) on the preamble signal outputted from radio receiver 201a to extract a control signal to be used for demodulating and decoding the data portion. The control signal may include, for example, information or parameters such as a BW, MCS, error correction coding method, and P-matrix information. For example, preamble demodulator 202a may output the extracted control information to data demodulator 205a, data decoder 206a, P-matrix determiner 203a, and channel estimator 204a.

P-matrix determiner 203a, for example, determines the type (or size) of the P-matrix added to the LTF included in the preamble of the received signal and P-matrix assignment information based on the P-matrix information outputted from preamble demodulator 202a. The determined information (hereinafter, sometimes referred to as P-matrix determination information) may be outputted to channel estimator 204a, for example.

Channel estimator 204a performs channel estimation using, for example, a reference signal (e.g., LTF) included in the preamble. For example, channel estimator 204a performs channel estimation using a P-matrix row vector corresponding to each spatial stream based on the P-matrix determination information outputted from P-matrix determiner 203a.

For example, when a plurality of P-matrix row vectors are added to a single spatial stream allocated to a received signal, channel estimator 204a performs channel estimation using each row vector, and outputs a maximal-ratio-combined channel estimate to data demodulator 205a. Meanwhile, when a plurality of P-matrices are not added to a single spatial stream allocated to the received signal (i.e., when P-matrix row vectors correspond to respective spatial streams), channel estimator 204a performs channel estimation using the row vector, for example, and outputs a channel estimate to data demodulator 205a.

Data demodulator 205a, for example, performs processing such as the FFT on the data signal outputted from radio receiver 201a, demodulates the data signal using the control information outputted from preamble demodulator 202a and the channel estimate outputted from channel estimator 204a, and outputs the demodulated data signal to data decoder 206a.

Data decoder 206a, for example, decodes the demodulated data signal outputted from data demodulator 205a using the control information outputted from preamble demodulator 202a, performs error determination such as CRC, and outputs error determination information to transmission signal generator 207a.

Transmission signal generator 207a generates a response signal (ACK or block ACK (referred to as BA)) based on, for example, the error determination information outputted from data decoder 206a. Further, transmission signal generator 207a, for example, generates a radio frame by adding a preamble signal to the data signal, and outputs the radio frame to radio transmitter 208a.

Radio transmitter 208a, for example, performs radio transmission processing such as D/A conversion and up-conversion to a carrier frequency on the radio frame outputted from transmission signal generator 207a, and transmits the signal subjected to the radio transmission processing to downlink radio transmission apparatus 100 via the antenna.

Specific Example of Embodiment 2

Figure 26:
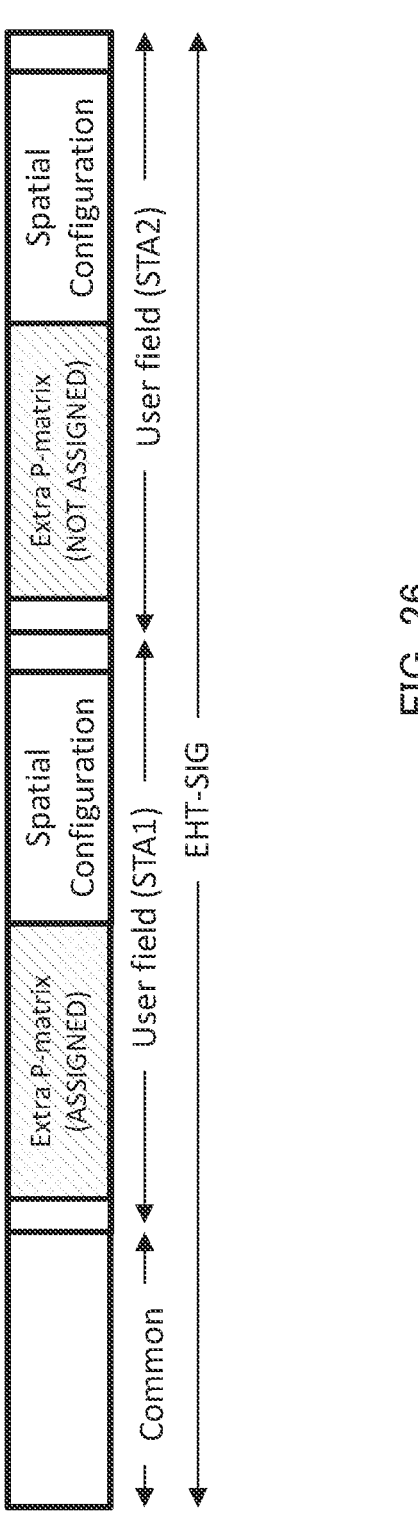
FIG. 26 illustrates an exemplary EHT-SIG format including extra P-matrices.
Figure 27:
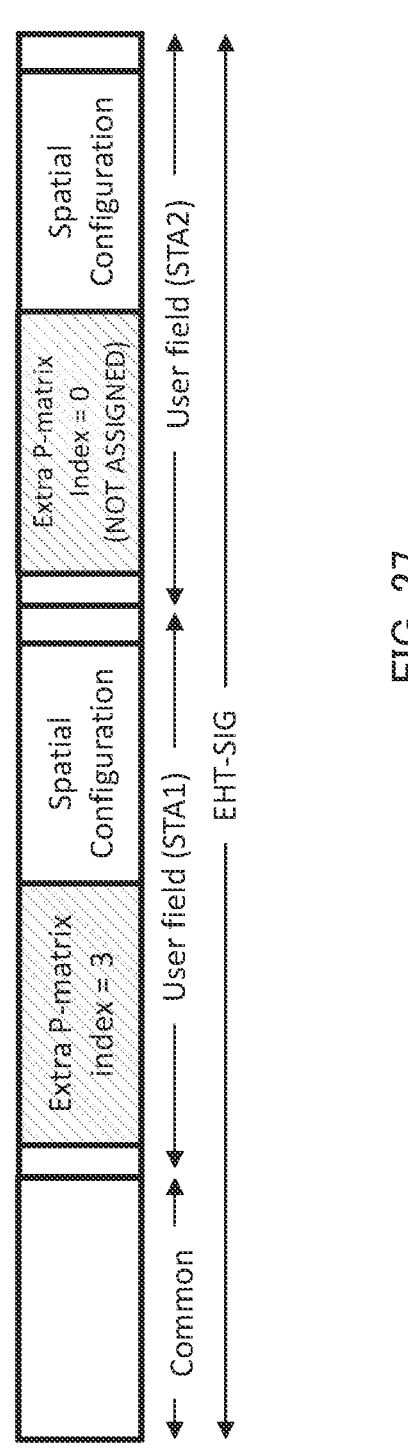
FIG. 27 illustrates an exemplary EHT-SIG format for indicating an extra P-matrix row index in each user information.

As illustrated in FIG. 26, for example, each user field of the EHT-SIG includes a subfield (referred to as an extra P-matrix) for indicating the P-matrix information (e.g., assignment information of an extra P-matrix row component) in the specific example of Embodiment 2. When extra P-matrix subfield≠0, the extra P-matrix subfield indicates the index of an additionally assigned P-matrix row as illustrated in FIG. 27, for example. When extra P-matrix subfield=0, it indicates that no extra P-matrix is assigned.

In this case, the type of P-matrix to be added to LTFs may be determined based on the sum of the number of LTFs and the number of row components of the P-matrix to be added. In other words, the type of P-matrix to be added to LTFs is not determined by referring only to the number of LTFs.

For example, when the number of LTFs is 4 in 11ax/11ac, it is determined to use $P_{4\times4}$ for the P-matrix to be added to LTFs by referring to Expression 1 in Embodiment 1. Meanwhile, in the specific example of Embodiment 2, when the number of LTFs ($N_{EHT-LTF}$)=4 and the number of extra P-matrix row indices (expressed as $N_{ex-P\ index}$)=1, it is determined to use $P_{6\times6}$ for the P-matrix to be added to LTFs by referring to the following Expression 3.

[3]

$$P_{EHT-LTF} = \begin{cases} P_{4\times4}, N_{EHT-LTF} + N_{ex-P\ index} = 1,2,4 & \text{(Expression 3)} \\ P_{6\times6}, N_{EHT-LTF} + N_{ex-P\ index} = 5,6 \\ P_{8\times8}, N_{EHT-LTF} + N_{ex-P\ index} = 7,8 \end{cases}$$

To assign a plurality of P-matrix row components to a single spatial stream, for example, a spatial weight matrix (referred to as Q-matrix) is used. In 11ax/11ac, the Q-matrix is a weight matrix consisting of the number of transmit antennas×the number of spatial streams and is added to the LTF and data portion to achieve spatial division multiplexing.

In the specific example of Embodiment 2, however, the Q-matrix is a matrix consisting of the number of transmit antennas×(the number of spatial streams+$N_{ex-P\ index}$). Thus, when the extra P-matrix is used, the number of spatial streams indicated in the $N_{STS}$ subfield or the spatial configuration subfield of an EHT-SIG may be different from the number of columns included in the Q-matrix. For example, the number of columns of a Q-matrix=the number of spatial streams in 11ax/ac, whereas the number of columns of a Q-matrix=(the number of spatial streams+N_(ex-P index)) in the case of using the extra P-matrix.

Figure 28:
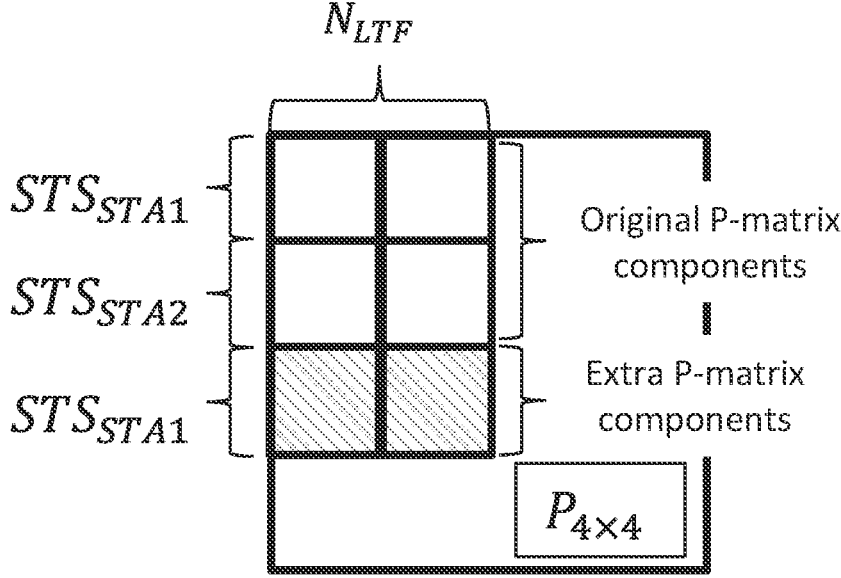
FIG. 28 illustrates exemplary LTFs in a case where one spatial stream is assigned to each of two users and one extra P-matrix row component is assigned to one of the two users.

To assign a plurality of P-matrix row components to a single spatial stream, for example, a Q-matrix including a plurality of "1" components in a column vector corresponding to the spatial stream is used. FIG. 28 illustrates an example there one spatial stream is assigned to each of STA 1 and STA 2 and one extra ow component is assigned to STA 1.

In this case, the first row of $P_{4\times4}$ is assigned to STA 1, and the second row $P_{4\times4}$ is assigned to STA 2 as the original P-matrix components. STA 1 identifies that the third row of $P_{4\times4}$ is assigned as an extra row component based on the extra P-matrix index information included in the user field for STA 1, performs channel estimation using each of the first third rows of $P_{4\times4}$, and combines the acquired channel estimates. STA 2 determines that no extra P-matrix is assigned based on the extra P-matrix index information included in the user field for STA 2, and performs channel estimation using the second row of $P_{4\times4}$.

The specific example of Embodiment 2 enables additional channel estimation using the extra P-matrix row component in the extra P-matrix subfield, and maximal ratio combining of the plurality of channel estimates improves channel estimation accuracy.

Overall Supplement

The EHT PPDU is used to indicate the extra LTF information in Embodiment 1, but a trigger frame may be used to instruct transmission of a trigger-based (TB) PPDU including an extra-LTF.

For example, as in Method 1, the extra-LTF information (extra-LTF subfield) may be added to each user information (user info subfield) of a trigger frame to indicate whether an extra-LTF is included in a TB PPDU to be transmitted to each user. FIG. 29 illustrates an exemplary trigger frame user info format for indicating the extra-LTF information in each user information.

Alternatively, a trigger frame type for indicating an extra-LTF may be defined, for example, as illustrated in FIG. 30.

Figure 31:
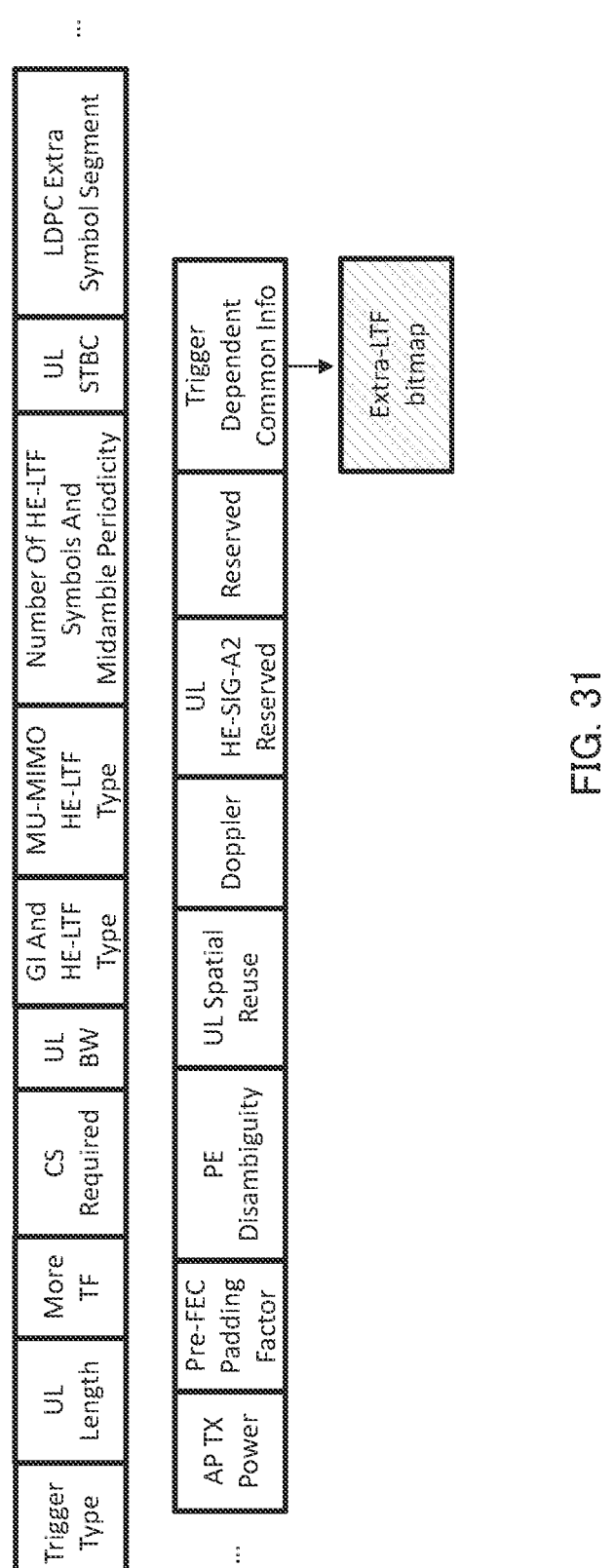
FIG. 31 illustrates an exemplary trigger frame common info format for indicating the extra-LTF by the bitmap in the common information.

When a trigger frame for indicating an extra-LTF is used, the presence or absence of an extra-LTF for each user may be indicated by replacing the trigger dependent common info with the extra-LTF bitmap as in specific example 1 of Method 2. An exemplary common info format of a trigger frame in this case is illustrated in FIG. 31.

Figure 32:
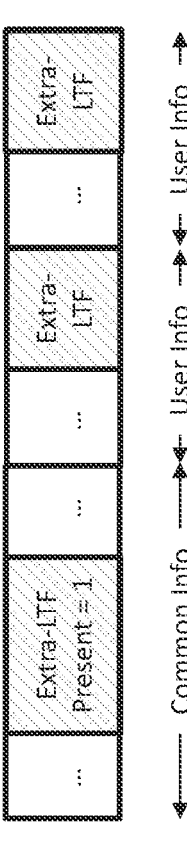
FIG. 32 illustrates an exemplary trigger frame common info format for indicating whether the extra-LTF information is included in the user information in the common information.

Alternatively, as in specific example 2 of Method 2, the extra-LTF present subfield may be added to the common info of a trigger frame, and the presence or absence of an extra-LTF may be indicated in each user info, for example. An exemplary trigger frame format in this case is illustrated in FIG. 32.

Expression 1 of Embodiment 1 and Expression 3 of Embodiment 2 represent methods of determining the type of P-matrix based on the number of LTFs when the number of LTFs is 8 or less, but the number of LTFs need not be limited to 8 or less. For example, in 11be, the type of P-matrix may be determined based on the number of LTFs when the number of LTFs is 16 or less.

Figure 33:
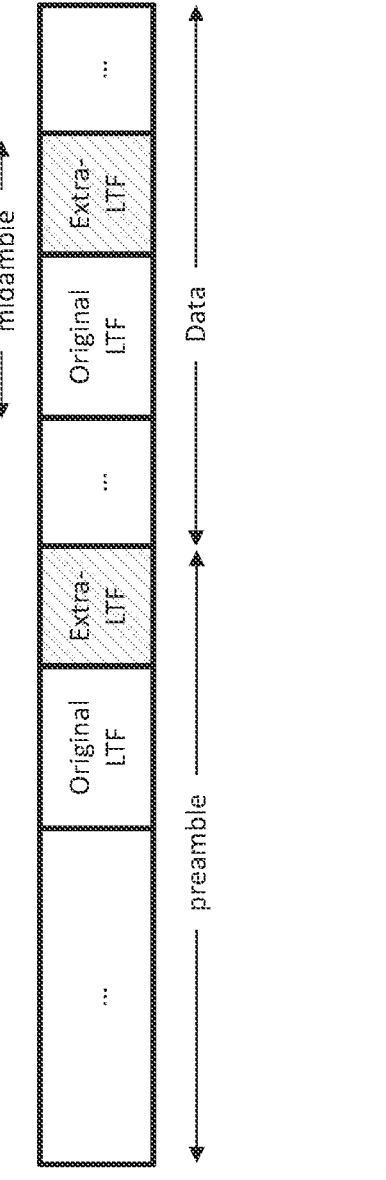
FIG. 33 illustrates an exemplary PPDU format in a case of using the extra-LTF and a midamble together.

In addition, when an extra-LTF and a midamble are used together (e.g., when channel estimation accuracy is easily degraded due to channel fading), LTFs including an extra-LTF may be inserted into a data portion as the midamble, for example, as illustrated in FIG. 33. In this case, the AP may indicate to the STA whether a midamble is included in a data portion by a Doppler field included in a preamble, as in 11ax.

In addition, the AP may determine the extra-LTF assignment based on the number of receive antennas of the STA. For example, when the AP identifies that the STA includes a predetermined number or more, of receive antennas based on the STA capability, the AP may transmit to the STA a signal to which spatial streams less than the number of receive antennas of the STA are assigned.

More receive antennas of the STA facilitates accurate channel separation in the STA between the original LTF and the extra-LTF, and channel estimation accuracy can be improved by performing maximal ratio combining of channel estimates acquired by the original LTF and the extra-LTF.

In addition, the STA may request transmission of a signal including an extra-LTF using control information for link adaptation that indicates a recommended transmission parameter to the AP. FIG. 34 illustrates an exemplary control information format for link adaptation. For example, the STA may combine the extra-LTF information and MCS as in Method 3 and request the AP for a signal including an extra-LTF by the HE-MCS field illustrated in FIG. 34.

Embodiments of the present disclosure have been described, thus far.

Other Embodiments

Although operations DL communication have been described in the above embodiments, an exemplary embodiment of the present disclosure may be applied to, for example, UL communication or sidelink without limited to the DL communication.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration.

However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured my be used. The present disclosure can be realized as digital processing or analogue processing.

If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. The communication apparatus may comprise a transceiver and processing/control circuitry. The transceiver may comprise and/or function as a receiver and a transmitter. The transceiver, as the transmitter and receiver, may include an RE (radio frequency) module including amplifiers, RF modulators/demodulators and the like, and one or more antennas. Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a tele-health/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infra-structure facility, such as a base station, an access point, and any other apparatus, device or system that communicates with or controls apparatuses such as those in the above non-limiting examples.

A communication apparatus according to an embodiment of the present disclosure includes: control circuitry, which, in operation, sets, to a control signal, information on an extra reference signal for each destination apparatus; and transmission circuitry, which, in operation, transmits the control signal.

In the communication apparatus according to an embodiment of the present disclosure, the control signal may include common information for a plurality of the destination apparatuses and individual information for each of the plurality of destination apparatuses, and the control circuitry may set, to the individual information, a field for indicating information on the extra reference signal.

In the communication apparatus according to an embodiment of the present disclosure, the information on the extra reference signal may be information indicating presence or absence of the extra reference signal.

In the communication apparatus according to an embodiment of the present disclosure, the information on the extra reference signal may be information indicating a number of the extra reference signals.

In the communication apparatus according to an embodiment of the present disclosure, the information on the extra reference signal may be information indicating a multiple of an original number of the reference signals.

In the communication apparatus according to an embodiment of the present disclosure, the control circuitry may switch a configuration of the control signal in accordance with presence or absence of the extra reference signal.

In the communication apparatus according to an embodiment of the present disclosure, in a case of the presence of the extra reference signal, the control circuitry may set a bitmap to common information for a plurality of the destination apparatuses in the control signal, the bitmap indicating the presence or absence of the extra reference signal for each of the plurality of destination apparatuses.

In the communication apparatus according to an embodiment of the present disclosure, in a case of the presence of the extra reference signal, the control circuitry may set the information on the extra reference signal to individual information for each of a plurality of the destination apparatuses in the control signal.

In the communication apparatus according to an embodiment of the present disclosure, the control circuitry may change, in accordance with a number of the destination apparatuses for which the extra reference signal is present, a method of indicating the information on the extra reference signal using the control signal.

In the communication apparatus according to an embodiment of the present disclosure, the control circuitry may set, to individual information for each of a plurality of the destination apparatuses in the control signal, information indicating a combination of the information on the extra reference signal and a modulation and coding scheme (MCS).

In the communication apparatus according to an embodiment of the present disclosure, the control circuitry may set, to individual information for each of a plurality the destination apparatuses in the control signal, assignment information of a row component of a mapping matrix that is added to the extra reference signal.

A communication apparatus according to an embodiment of the present disclosure includes: reception circuitry, which, in operation, receives a control signal including information on an extra reference signal for each destination apparatus; and control circuitry, which, in operation, determines the extra reference signal to be used for channel estimation based on the information on the extra reference signal.

A communication method according to an embodiment of the present disclosure includes: configuring, by a communication apparatus, to a control signal, information on an extra reference signal for each destination apparatus; and transmitting, by the communication apparatus, the control signal.

A communication method according to an embodiment of the present disclosure includes: receiving, by a communication apparatus, a control signal including information on an extra reference signal for each destination apparatus; and determining, by the communication apparatus, the extra reference signal to be used for channel estimation based on the information on the extra reference signal.

The disclosure of Japanese Patent Application No. 2021-005046, filed on Jan. 15, 2021, including the specification, drawings and abstract, is incorporated herein by reference in its entirety.

INDUSTRIAL APPLICABILITY

An exemplary embodiment of the present disclosure is useful for radio communication systems.

REFERENCE SIGNS LIST

100 Downlink radio transmission apparatus
101, 101*a*, 201, 201*a* Radio receiver
102, 102*a* Received signal decoder
103, 103*a* Scheduler
104, 104*a* Data generator
105, 105*a* Data encoder
106, 106*a* Data modulator
107, 107*a* Preamble generator
108, 108*a*, 208, 208*a* Radio transmitter
200 Downlink radio reception apparatus
202, 202*a* Preamble demodulator
203 Extra-LTF determiner
203*a* P-matrix determiner
204, 204*a* Channel estimator
205, 205*a* Data demodulator
206, 206*a* Data decoder
207, 207*a* Transmission signal generator

The invention claimed is:

1. A communication apparatus, comprising:
control circuitry, which, in operation, sets, to an extremely high throughput physical layer convergence procedure protocol data unit (EHT PPDU), information on an extra reference signal for each destination apparatus; and
transmission circuitry, which, in operation, transmits the EHT PPDU,
wherein,
the information is included in a common field of an EHT signal (EHT-SIG) as an extra subfield of a universal signal (U-SIG), and
the control circuitry sets a number of EHT long training fields (EHT-LTFs) in the EHT PPDU greater than a number of EHT-LTFs specified based on a number of spatial streams.

2. The communication apparatus according to claim 1, wherein the information on the extra reference signal is information indicating presence or absence of the extra reference signal.

3. The communication apparatus according to claim 1, wherein the information on the extra reference signal is information indicating a number of the extra reference signals.

4. The communication apparatus according to claim 1, wherein the information on the extra reference signal is information indicating a multiple of an original number of the reference signals.

5. The communication apparatus according to claim 1, wherein the control circuitry switches a configuration of the EHT PPDU in accordance with presence or absence of the extra reference signal.

6. The communication apparatus according to claim 5, wherein, in a case of the presence of the extra reference signal, the control circuitry sets a bitmap to common information for a plurality of the destination apparatuses in the EHT PPDU, the bitmap indicating the presence or absence of the extra reference signal for each of the plurality of destination apparatuses.

7. The communication apparatus according to claim 1, wherein the control circuitry sets, to individual information for each of a plurality of the destination apparatuses in the EHT PPDU, assignment information of a row component of a mapping matrix that is added to the extra reference signal.

8. A communication method, comprising:
configuring, by a communication apparatus, to an extremely high throughput physical layer convergence procedure protocol data unit (EHT PPDU), information on an extra reference signal for each destination apparatus; and
transmitting, by the communication apparatus, the EHT PPDU,
wherein,
the information is included in a common field of an EHT signal (EHT-SIG) as an extra subfield of a universal signal (U-SIG), and
a number of EHT long training fields (EHT-LTFs) in the EHT PPDU is set greater than a number of EHT-LTEs specified based on a number of spatial streams.

9. An integrated circuit, comprising:
control circuitry, which, in operation, sets, to an extremely high throughput physical layer convergence procedure protocol data unit (EHT PPDU), information on an extra reference signal for each destination apparatus; and
transmission circuitry, which, in operation, controls transmission of the EHT PPDU,
wherein,
the information is included in a common field of an EHT signal (EHT-SIG) as an extra subfield of a universal signal (U-SIG), and
a number of EHT long training fields (EHT-LTFs) in the EHT PPDU is set greater than a number of EHT-LTFs specified based on a number of spatial streams.

* * * * *